United States Patent
Poppen et al.

(10) Patent No.: US 10,731,371 B2
(45) Date of Patent: *Aug. 4, 2020

(54) DOUBLE END STUD BOLT AND METHOD OF USE

(71) Applicant: Sukup Manufacturing Co., Sheffield, IA (US)

(72) Inventors: Bradley Allan Poppen, Sheffield, IA (US); John Arthur Hanig, Sheffield, IA (US)

(73) Assignee: SUKUP MANUFACTURING CO., Sheffield, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,440

(22) Filed: Aug. 22, 2019

(65) Prior Publication Data

US 2019/0376305 A1    Dec. 12, 2019

Related U.S. Application Data

(63) Continuation of application No. 15/851,073, filed on Dec. 21, 2017, now Pat. No. 10,407,935.

(Continued)

(51) Int. Cl.
*E04H 7/22* (2006.01)
*E04H 7/30* (2006.01)
(Continued)

(52) U.S. Cl.
CPC ............. *E04H 7/22* (2013.01); *B65D 88/08* (2013.01); *B65D 90/027* (2013.01); *E04H 7/30* (2013.01);
(Continued)

(58) Field of Classification Search
CPC .... E04H 7/30; E04H 7/22; E04H 7/24; B65D 88/08; B65D 90/27; F16B 5/0275
See application file for complete search history.

(56) References Cited

U.S. PATENT DOCUMENTS 3,129,791 A * 4/1964 Gumucio ............. B65D 90/023
                                                        52/261
3,897,713 A * 8/1975 Gugle .................... F16B 5/0275
                                                        411/389

(Continued)

FOREIGN PATENT DOCUMENTS

FR           1165842 A * 10/1958 ........... B65D 90/027

*Primary Examiner* — Christine T Cajilig
(74) *Attorney, Agent, or Firm* — Christopher A. Proskey; BrownWinick Law Firm

(57) ABSTRACT

A system of connecting a stiffener to the sidewall of a grain bin using a stud bolt having a first threaded end, a second threaded end and a feature positioned between the first end and a second end. A sealing member is positioned over the first end of the stud bolt, which in one case is a metallic washer with an affixed compressible sealing member. The first end of the stud bolt is inserted into a hole in the sidewall and an inner nut is placed over the first end inside the sidewall. As the inner nut is tightened, the feature is pulled toward the exterior surface of the grain bin thereby causing the sealing member to form a seal with the exterior surface of the grain bin. The second end of the stud bolt is inserted into a hole in the stiffener which is tightened onto the stud bolt.

21 Claims, 21 Drawing Sheets

Related U.S. Application Data

(60) Provisional application No. 62/438,289, filed on Dec. 22, 2016.

(51) Int. Cl.
  *B65D 88/08* (2006.01)
  *F16B 5/02* (2006.01)
  *F16B 33/02* (2006.01)
  *F16B 43/00* (2006.01)
  *B65D 90/02* (2019.01)
  *F16B 33/00* (2006.01)
  *F16B 35/04* (2006.01)

(52) U.S. Cl.
  CPC .......... *F16B 5/0275* (2013.01); *F16B 33/004* (2013.01); *F16B 33/02* (2013.01); *F16B 35/042* (2013.01); *F16B 43/001* (2013.01)

(56) References Cited

U.S. PATENT DOCUMENTS

| | | | | |
|---|---|---|---|---|
| 4,304,503 | A * | 12/1981 | Gehring | F16B 35/04 29/525.04 |
| 4,334,815 | A * | 6/1982 | Knohl | F16B 35/007 411/368 |
| 8,291,664 | B2 * | 10/2012 | Hanig | B65D 90/022 220/4.33 |
| 8,631,629 | B1 * | 1/2014 | Wiener | F16B 5/0275 52/745.21 |
| 9,033,637 | B2 * | 5/2015 | Mitrovic | F16B 5/0275 411/338 |
| 9,937,693 | B2 * | 4/2018 | Erb | B32B 37/1292 |
| 2007/0075553 | A1 * | 4/2007 | Lalancette | F16B 5/0275 292/256.67 |
| 2011/0023411 | A1 * | 2/2011 | Grossman | E04H 7/30 52/848 |
| 2015/0184389 | A1 * | 7/2015 | Ekmekci | E04H 7/30 52/630 |

* cited by examiner

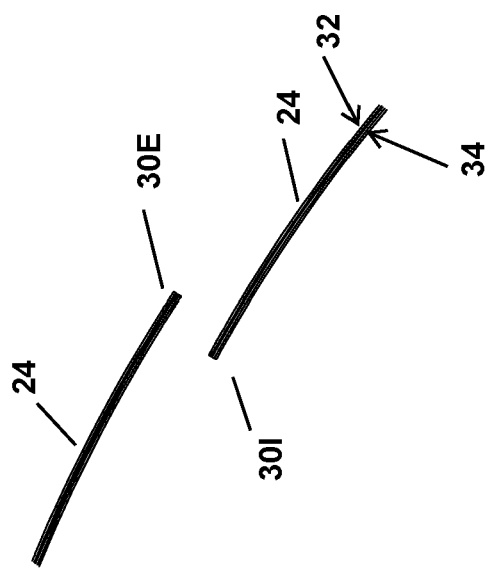

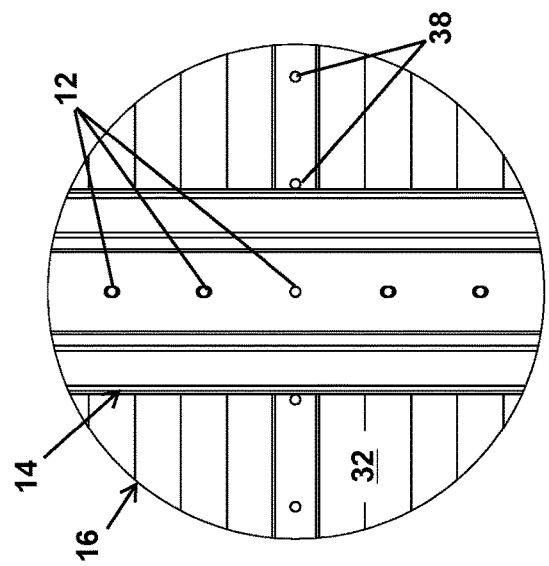
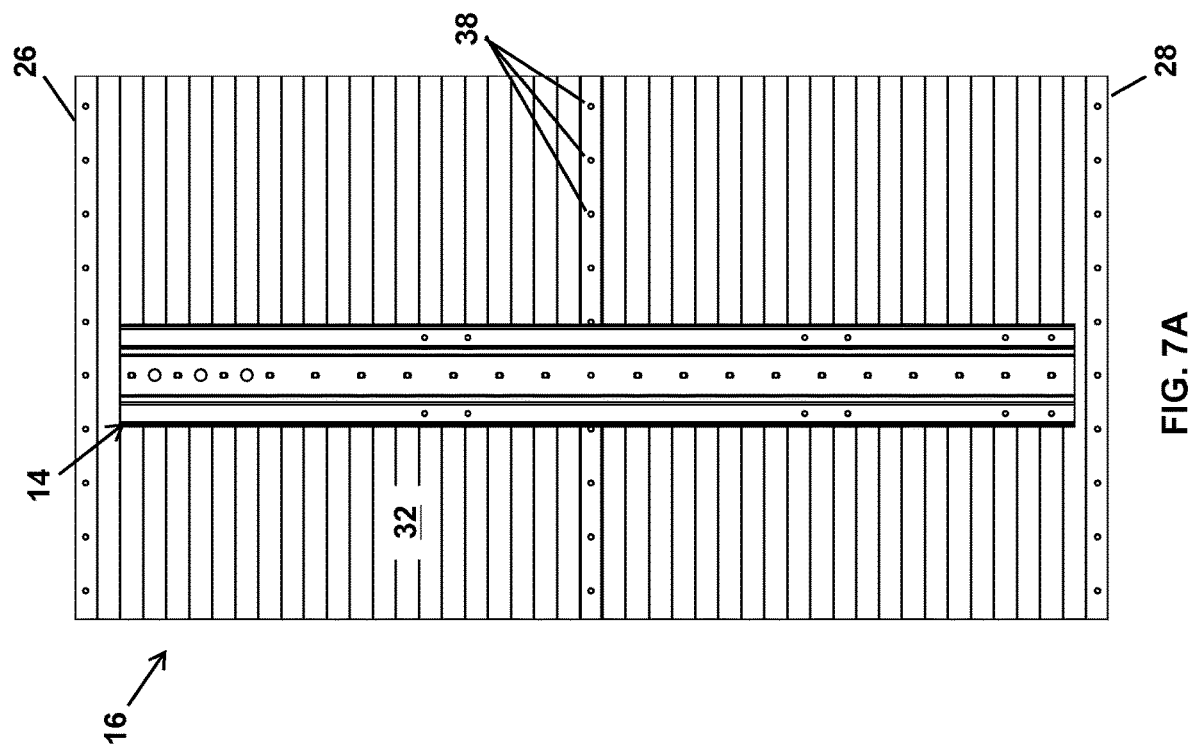
FIG. 7B
FIG. 7A

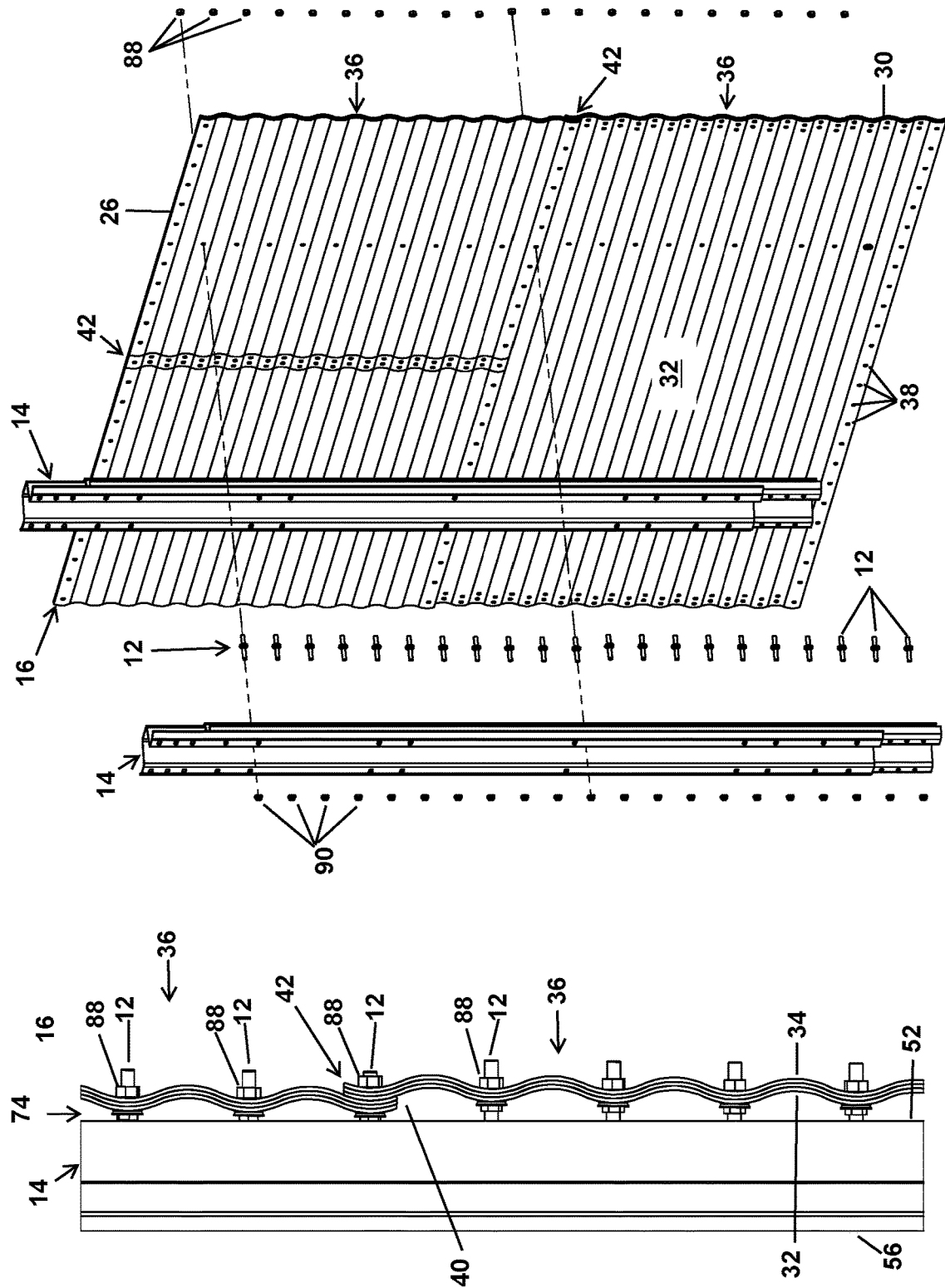

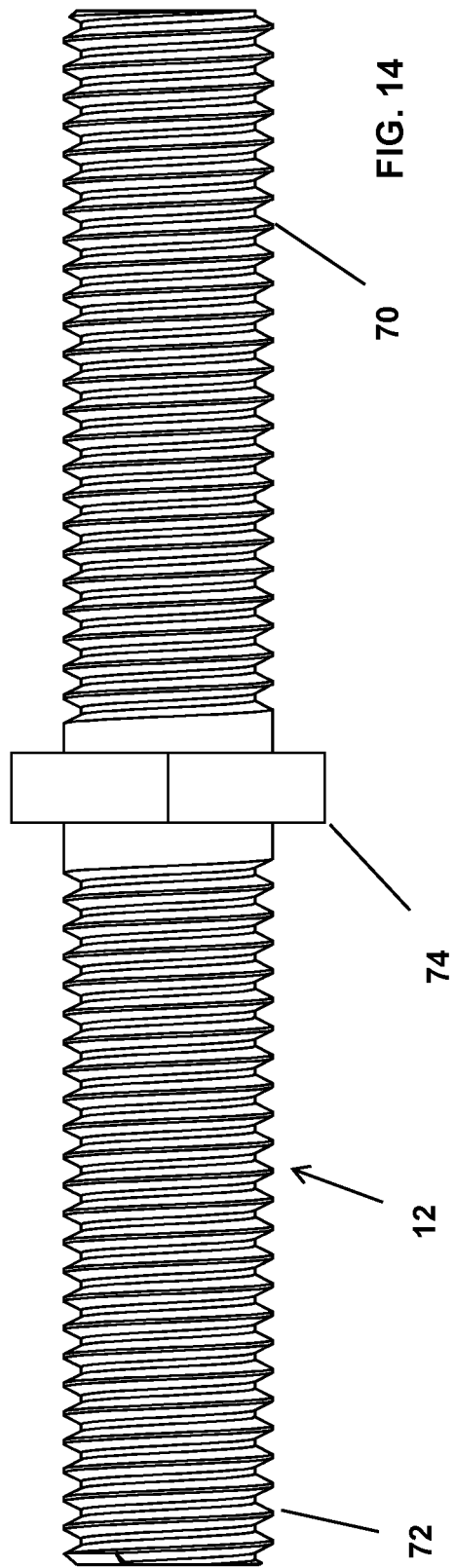
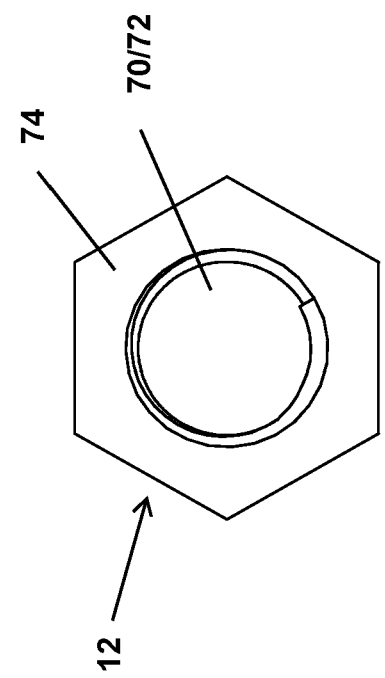
FIG. 14
FIG. 15

DOUBLE END STUD BOLT AND METHOD OF USE

CROSS REFERENCE TO RELATED APPLICATIONS

This application is a continuation of United States Patent and Trademark Office Utility application Ser. No. 15/851,073 which was filed Dec. 21, 2017, which claims the benefit of United States Patent and Trademark Office Provisional Application No. 62/438,289 which was filed on Dec. 22, 2016, the entirety of which is incorporated herein by reference.

FIELD OF THE DISCLOSURE

This disclosure relates to grain storage devices used in agriculture. More specifically and without limitation, this disclosure relates to a double ended stud bolt system and method of use for installing external stiffeners on the sidewall of grain bins.

BACKGROUND OF THE DISCLOSURE

Grain bins are massive structures used to store bulk flowable grain products such as corn, soybeans, wheat, rice, or any other grain products or other material. Conventional grain bins are generally formed in a cylindrical shape with a corrugated sidewall covered by a peaked roof. Grain bins vary in height (ranging from twenty feet high to over a hundred and fifty feet high), and diameter, (ranging from eighteen feet in diameter to over a hundred and fifty feet in diameter). The storage capacity of modern grain bins can range anywhere from a few thousand bushels to well over a million bushels.

Grain bins are often used to store grain for long periods of time. To ensure the stability of bulk grain during long-term storage the moisture level of the grain is closely monitored and controlled. As an example, corn is often stored within the narrow range of 13% to 16% moisture. If, however, the moisture level exceeds certain limits, the grain will likely spoil.

The spoilage of grain is obviously undesirable. Spoiled grain is a direct financial loss. Another problem associated with spoiled grain is that the spoilage process has a tendency to form clumps within the grain. Clumped grain often does not easily flow out of the grain bin causing a blockage in the flow of material out of the grain bin. In addition, clumped grain has a tendency to stick to the grain bin walls and/or get stuck in grain handling equipment. As such, clumped grain can cause breakdowns, plugs and unloading problems. The cleaning and removal of clumped grain within a grain bin can be a difficult, time consuming and arduous task. It is for these and many other reasons that great efforts are taken to prevent moisture from penetrating grain bins.

The growth in the size and sophistication of grain bin designs has complicated the process of sealing moisture out of grain bins. As an example, many large commercial grain bins have sidewalls formed of multiple sheets of corrugated steel that are layered upon one another, or "laminated." These laminated sheets provide additional strength and rigidity to the grain bin. However, these laminated sheets substantially complicate the assembly process. In addition, these laminated sheets make it more complicated to prevent water from entering the grain bin as water can travel between the laminated sheets and seep into the grain bin.

Complicating matters further, many large sized commercial grain bins use external stiffeners to provide additional strength and rigidity to the grain bin. An external stiffener is an elongated structural member that generally extends vertically along a grain bin sidewall. External stiffeners can themselves be formed of a plurality of layers, meaning that the external stiffeners themselves are "laminated." These external stiffeners are generally bolted to the exterior surface of the grain bin sidewall. While these external stiffeners are successful at increasing the strength of the grain bin, these stiffeners further complicate the assembly process. In addition, attaching external stiffeners to the grain bin sidewall makes it more complicated to prevent water from entering the grain bin as water can travel between the stiffener and the sidewall and into the grain bin if not sealed properly.

It is particularly difficult to seal the intersection between the inward surface of the stiffener and the exterior surface of the grain bin. This is especially true just below the intersection between rings where the upper ring hangs over a portion of the lower ring thereby forming a step. This step makes it difficult if not impossible to draw the interior surface of the stiffener against the exterior surface of the grain bin to provide a seal. When a gap is left between the interior surface of the stiffener and the exterior surface of the grain bin water has a tendency to find its way through this unsealed intersection and into the grain bin along the shaft of the bolt connecting the stiffener to the sidewall.

Conventionally, bolts used to connect a stiffener to a grain bin are inserted from the interior of the grain bin outward through the sidewall and through the stiffener thereby connecting the stiffener to the sidewall. Conventionally, the head of these bolts are sealed against the interior surface of the interior layer of the laminated sheet that forms the sidewall. Sealing the head of these bolts against the interior surface of the interior layer of the laminated sheet that forms the sidewall does not prevent water from entering the grain bin. Instead, sealing the head of these bolts against the interior surface of the interior layer of the laminated sheet that forms the sidewall forces the water to travel between the layers of the laminated sheets, which is, in and of itself, undesirable as water between the layers of the laminated sheet is likely to promote inter-layer corrosion and reduce the longevity and useful life of the grain bin.

Over time, at least a portion of the water between the layers of the laminated sheets tends to seep into the grain bin by exiting an edge of the laminated sheet that is positioned within the grain bin. This moisture then causes spoilage of the grain in the area around the leak which is undesirable.

Therefore, for all the reasons stated above, and the reasons stated below, there is a need in the art for an improved manner of connecting a stiffener to the sidewall of a bin that prevents moisture from entering the grain bin.

Thus, it is a primary object of the disclosure to provide a system of connecting a stiffener to the sidewall of a bin that improves upon the state of the art.

Another object of the disclosure is to provide a system of connecting a stiffener to the sidewall of a grain bin that prevents water from seeping into the grain bin.

Yet another object of the disclosure is to provide a system of connecting a stiffener to the sidewall of a grain bin that is easy to use.

Another object of the disclosure is to provide a system of connecting a stiffener to the sidewall of a grain bin that provides a seal against the exterior surface of the sidewall of the grain bin regardless whether a gap is present between the stiffener and the sidewall.

Yet another object of the disclosure is to provide a system of connecting a stiffener to the sidewall of a grain bin that has a long useful life.

Another object of the disclosure is to provide a system of connecting a stiffener to the sidewall of a grain bin that is durable.

Yet another object of the disclosure is to provide a system of connecting a stiffener to the sidewall of a grain bin that is easy to manufacture.

Another object of the disclosure is to provide a system of connecting a stiffener to the sidewall of a grain bin that is relatively inexpensive.

Yet another object of the disclosure is to provide a system of connecting a stiffener to the sidewall of a grain bin that has a robust design.

Another object of the disclosure is to provide a system of connecting a stiffener to the sidewall of a grain bin that is high quality.

Yet another object of the disclosure is to provide a system of connecting a stiffener to the sidewall of a grain bin that is easy to install.

Another object of the disclosure is to provide a system of connecting a stiffener to the sidewall of a grain bin that can be installed using conventional equipment and tools.

Yet another object of the disclosure is to provide a system of connecting a stiffener to the sidewall of a grain bin that reduces or prevents water from getting between the layers of a laminated sidewall.

Another object of the disclosure is to provide a system of connecting a stiffener to the sidewall of a grain bin that reduces grain spoilage.

Yet another object of the disclosure is to provide a system of connecting a stiffener to the sidewall of a grain bin that reduces grain bin corrosion.

Another object of the disclosure is to provide a system of connecting a stiffener to the sidewall of a grain bin that reduces clumping of grain within a grain bin.

Yet another object of the disclosure is to provide a system of connecting a stiffener to the sidewall of a grain bin that can be used with any grain bin.

Another object of the disclosure is to provide a system of connecting a stiffener to the sidewall of a grain bin that can be used with any stiffener.

Yet another object of the disclosure is to provide a system of connecting a stiffener to the sidewall of a grain bin that extends the useful life of a grain bin.

Yet another object of the disclosure is to provide a system of connecting a stiffener to the sidewall of a grain bin that facilitates a secure connection between the sidewall of the grain bin and the stiffener.

Yet another object of the disclosure is to provide a system of connecting a stiffener to the sidewall of a grain bin that provides a new and improved manner of assembling an externally stiffened grain bin These and other objects, features, or advantages of the disclosure will become apparent from the specification, figures and claims.

SUMMARY OF THE DISCLOSURE

A system of connecting a stiffener to the sidewall of a grain bin using a double end stud bolt having a first threaded end, a second threaded end and a feature positioned between the first end and a second end is presented. A sealing member is positioned over the first end of the stud bolt, which in one case is a metallic washer with an affixed compressible member, such as a rubber, plastic, composite or other washer formed of a non-metallic or other material that facilitates a seal. The first end of the stud bolt is inserted into a hole in the sidewall and an inner nut is placed over the first end inside the sidewall. As the inner nut is tightened, the feature is pulled toward the exterior surface of the grain bin thereby causing the sealing member to form a seal with the exterior surface of the grain bin. The second end of the stud bolt is inserted into a hole in a stiffener and an outer nut is placed over the second end on the exterior side of the stiffener. As the outer nut is tightened, the stiffener is pulled toward the exterior surface of the grain bin thereby connecting the stiffener to the grain bin. This arrangement provides the advantage of forming a durable, repeatable, long term, and robust seal between the sealing member and the exterior surface of the sidewall of the grain bin regardless of whether the interior surface of the stiffener engages the exterior surface of the grain bin.

BRIEF DESCRIPTION OF THE DRAWINGS

FIG. 3A is a close up exploded elevation view of a portion of the ring shown in FIG. 3;

FIG. 7A is an elevation view of a section of grain bin sidewall; the view showing an external stiffener attached to the exterior surface of the grain bin sidewall;

FIG. 7B is a close up elevation view of a section of grain bin sidewall shown in FIG. 7A; the view showing an external stiffener attached to the exterior surface of the grain bin sidewall;

FIG. 8B is a side cut-away elevation view of the improved sidewall of a grain bin with a stiffener connected to the exterior surface of the sidewall using stud bolts; the view also showing two rings overlapping one another thereby forming a step below the seam; the view showing stud bolts extending from the exterior surface of the grain bin sidewall inward through the sidewall and attaching to an inner nut within the grain bin; the view showing stud bolts extending outward from the exterior surface of the grain bin sidewall and through the stiffener; the view showing no gap between the exterior surface of the sidewall and the interior surface of a feature of the stud bolt positioned between the stiffener and the sidewall thereby sealing the exterior surface of the grain bin sidewall regardless of a space between the interior surface of the stiffener and the exterior surface of the sidewall;

FIG. 9B is a perspective view of a section of the improved grain bin sidewall; the view showing a stiffener connected to the exterior surface of the grain bin sidewall and another stiffener about to be installed on the grain bin sidewall using stud bolts that have a first threaded end that extends through the grain bin sidewall and a second threaded end that extends through the stiffener and a feature positioned between the first threaded end and the second threaded end that is positioned between the stiffener and the sidewall of the grain bin; the view showing an inner nut positioned over the first threaded end of the stud bolt inside of the grain bin and an outer nut positioned over the second threaded end after the second threaded end is extended through the stiffener; the view showing no gap between the exterior surface of the sidewall and the interior surface of a feature of the stud bolt positioned between the stiffener and the sidewall thereby sealing the exterior surface of the grain bin sidewall regardless of a space between the interior surface of the stiffener and the exterior surface of the sidewall;

FIG. 14 is a side elevation view of a stud bolt having a first threaded end and a second threaded end and a feature positioned between first threaded end and a second threaded end, the feature having a hexagonal or hex-head shape; the view showing the feature formed as part of the stud bolt in a unitary and monolithic manner;

FIG. 15 is an end elevation view of a stud bolt having a first threaded end and a second threaded end and a feature positioned between first threaded end and a second threaded end, the feature having a hexagonal or hex-head shape;

DETAILED DESCRIPTION OF THE DISCLOSURE

Figure 1:
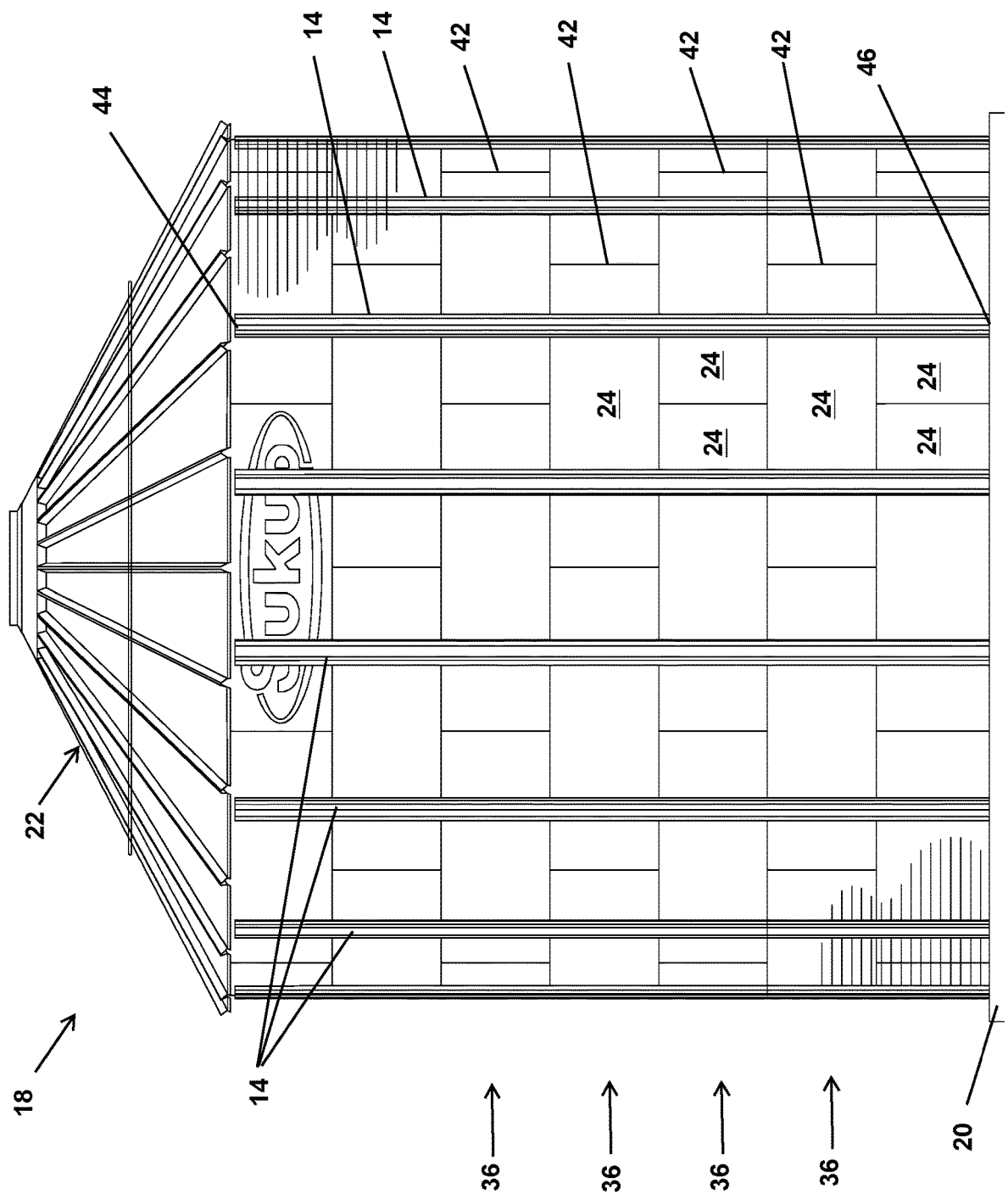
FIG. 1 is a an elevation view of an externally stiffened grain bin; the view showing the grain bin having a sidewall formed of a plurality of sheets that are connected to one another at seams that form rings; the view showing a plurality of rings vertically stacked upon one another to form the sidewall; the view showing stiffeners extending the length of the sidewall; the view showing the stiffeners extending the length of the sidewall in a position wherein the stiffeners do not overlap with the seams between adjacent sheets of a ring.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides, left, right, and the like are referenced according to the views, pieces, parts, components and figures presented. It should be understood, however, that the terms are used only for purposes of description, and are not intended to be used as limitations. Accordingly, orientation of an object or a combination of objects may change without departing from the scope of the disclosure.

With reference to the figures, a double ended stud bolt system 10 (system 10) is presented that includes a stud bolt 12 that is used to install a stiffener 14 onto a sidewall 16 of a grain bin 18, as is further described herein.

Grain Bin:

In the arrangement shown, double ended stud bolt system 10 is used in association with a grain bin 18. Grain bin 18 may be formed of any suitable size, shape and design and is configured to hold a bulk amount of flowable material such as grain or the like materials. In one arrangement, as is shown, grain bin 18 is a large, generally cylindrical structure that has a curved sidewall 16. Sidewall 16 connects at its lower end to a foundation 20. Sidewall 16 connects at its upper end to a peaked roof 22.

Sidewall 16 of grain bin 18 is formed of any suitable size, shape and design. In one arrangement, as is shown, sidewall 16 is formed of a plurality of sheets 24 of material. Sheets 24 have an upper edge 26, a lower edge 28 and side edges 30. Sheets 24 have in exterior surface 32 and interior surface 34. In the arrangement shown, these sheets 24 are formed of corrugated material. That is, when sheets 24 are viewed from their side edge 30, the sheets 24 have a repetitive oscillating curve that smoothly transitions between rounded peaks and rounded valleys, similar to that of a sine-wave or sine-function. This corrugation provides strength and rigidity to the sidewall 16 however the corrugation provides a number of challenges, such as manufacturing complexities and preventing water from infiltrating the grain bin 18. Any other configuration of sidewall 16 and more broadly grain bin 18, is hereby contemplated for use in association with stiffener 14 and stud bolt 12.

Sheets 24 of sidewall 16 may be formed of a single layer of material. Alternatively, to increase the strength and rigidity of the sidewall 16 a plurality of sheets 24 may be laid over one another thereby forming what is known as a "laminated" sheet 24 or sidewall 16. Laminated sheets 24 may include two, three, four, five or any other number of layers.

Figure 3:
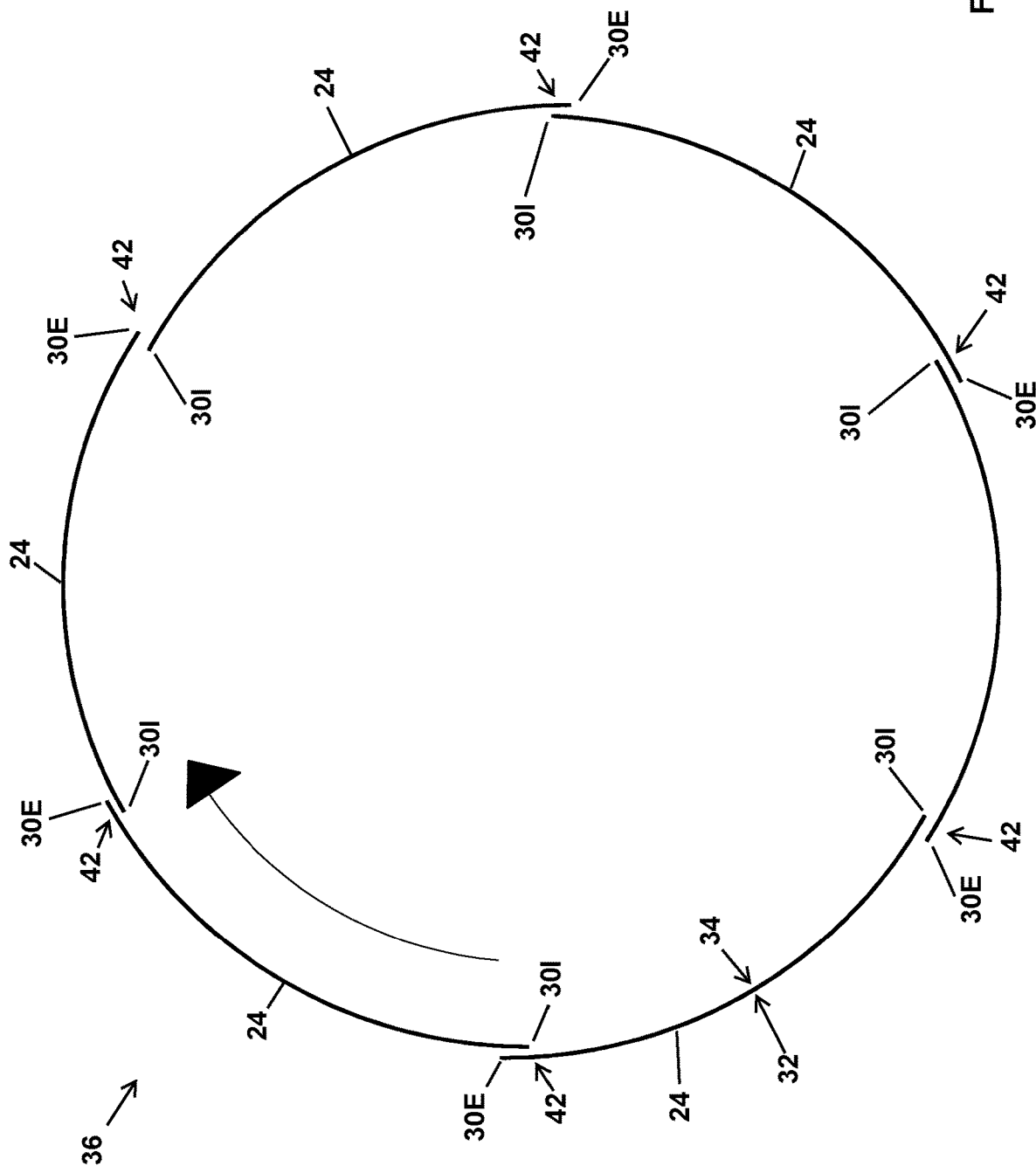
FIG. 3 is an exploded top elevation view of a ring of a grain bin; the view showing a plurality of sheets in exploded overlapping condition prior to assembly; the view showing the sheets extending between opposing side edges, wherein one side edge of each sheet is positioned inward of the side edge of one adjacent sheet and the other side edge of each sheet is positioned outward of the other adjacent sheet thereby forming an interior side edge and an exterior side on each sheet; the overlapping portion of adjacent sheets form a seam that is connected together using sidewall bolts.
Figure 4:
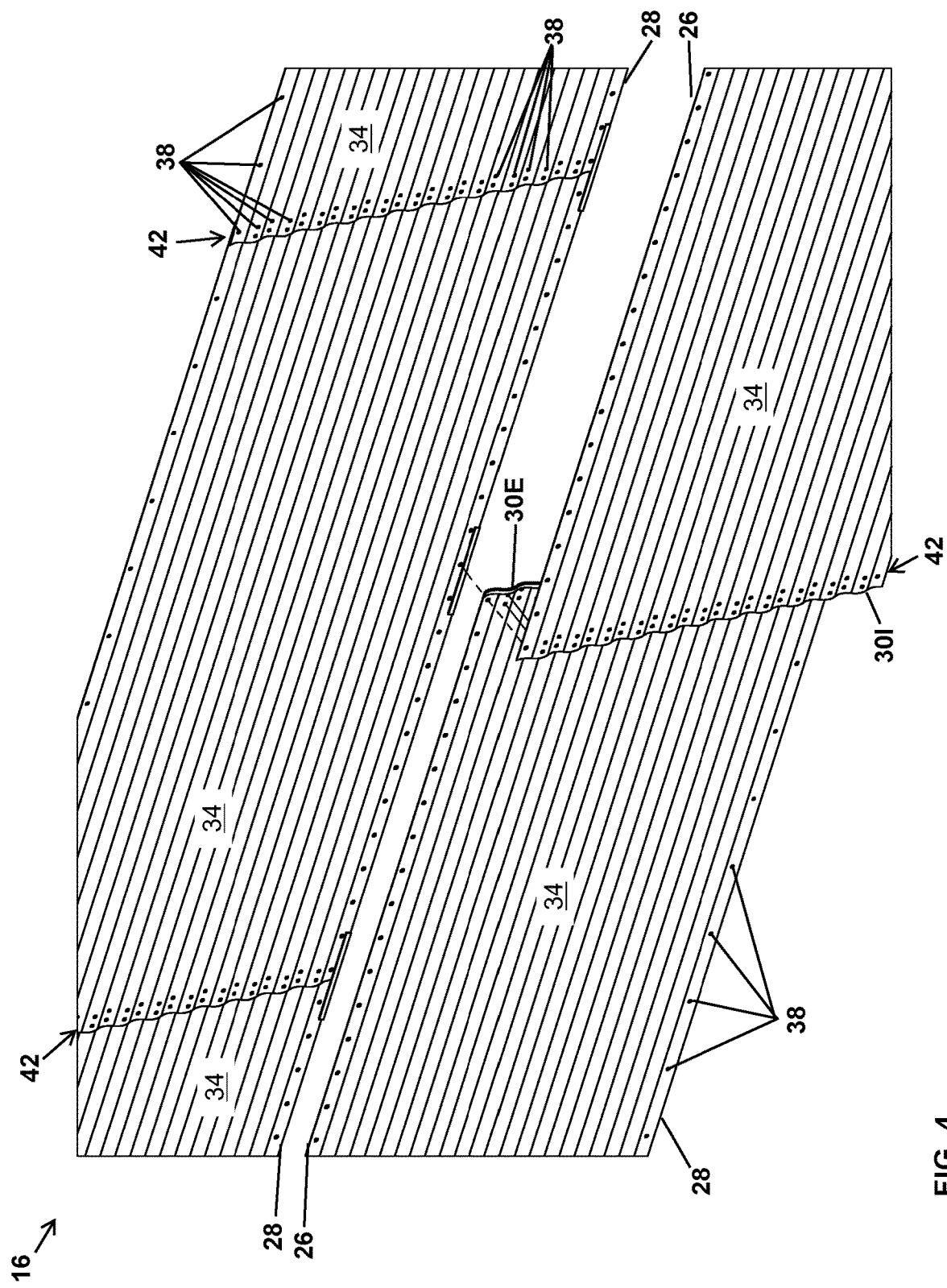
FIG. 4 is an exploded perspective view of a section of grain bin sidewall; the view showing a plurality of sheets in staggered overlapping condition prior to assembly; the view showing the interior surface of the sidewall; the view showing adjacent sheets overlapping at seams and connected together using sidewall bolts.
Figure 5:
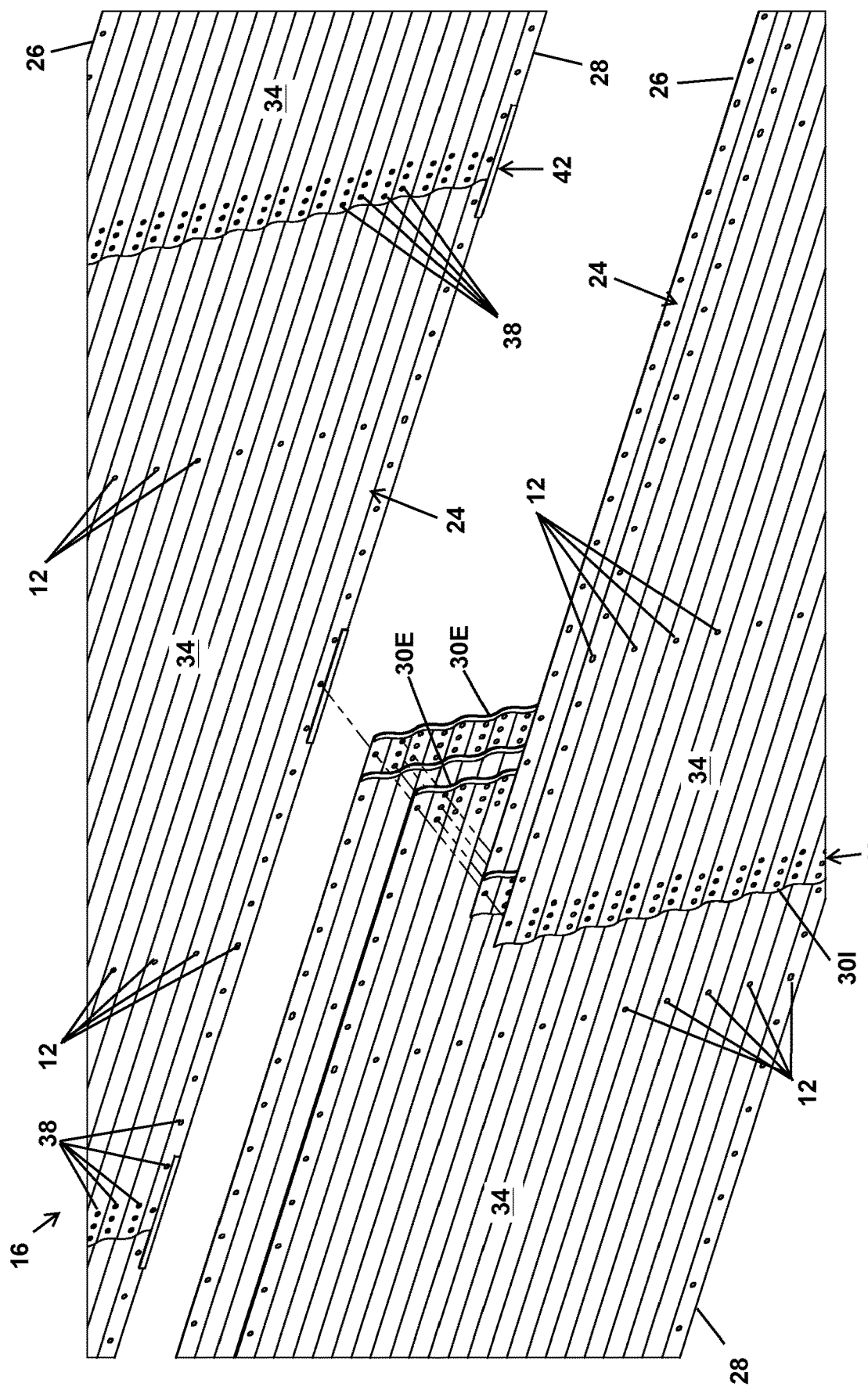
FIG. 5 is an exploded perspective view of a section of grain bin sidewall; the view showing a plurality of sheets in staggered overlapping condition prior to assembly; the view showing sheets formed of two layers in a laminated condition; the view showing rows of holes that are configured to receive stud bolts therein for the attachment of stiffeners on either side of the seams.

In one arrangement, as is shown, sheets 24 curve slightly from side edge 30 to side edge 30 such that each sheet 24 forms a partial portion of a cylinder. In this arrangement, a plurality of sheets 24 are connected together in side-to-side arrangement to form what is known as a ring 36. With reference to FIG. 3, each ring 36 is formed of a plurality of sheets 24 connected together with each sheet 24 having one side edge 30 positioned inside of an adjacent sheet 24 and the opposite side edge 30 positioned outside of the other adjacent sheet 24. As an example, when moving in a clockwise direction, the first side edge 30 of a sheet 24 is positioned on the interior side of the prior sheet 24 whereas the second side edge 30 of a sheet is positioned on the exterior side of the next sheet 24. Adjacent sheets 24 are connected together using a plurality of sidewall bolts 38 that extend through the overlapping portion of adjacent sheets 24.

In one arrangement, as is shown, rings 36 are vertically stacked to form sidewall 16. Rings 36 are stacked in such a manner that the lower edge 28 of the sheets 24 of the upper-positioned ring 36 is positioned on the outside of the upper edge 26 of the sheets 24 of the lower-positioned ring 36. The vertically adjacent sheets 24 are then connected together using a plurality of sidewall bolts 38 that extend through the overlapping portion of the vertically adjacent sheets 24.

By overlapping the vertically stacked rings 36 in this manner this forms a step 40 where the exterior surface 32 at the lower edge 28 of the upper positioned sheet 24 is spaced outward a distance "D" from the exterior surface 32 of lower positioned sheet 24. This distance "D" is equivalent to the thickness of sheet 24. The thicker the sheet 24, the greater the distance "D" of step 40. This step 40 helps to shed water running down the exterior surface 32 of sidewall 16. By positioning the lower edge 28 of the sheets 24 of the upper-positioned ring 36 on the outside of the upper edge 26 of the sheets 24 of the lower-positioned ring 36 this serves much like shingles of a roof and water on the exterior surface of the grain bin 18 under the force of gravity runs down the sidewall 16 and has a limited the opportunity to infiltrate the layers of sheets 24. However, this step 40 provides a problem when attaching a stiffener 14 to the exterior surface 32 of the sidewall 16, as is further described herein.

Figure 2:
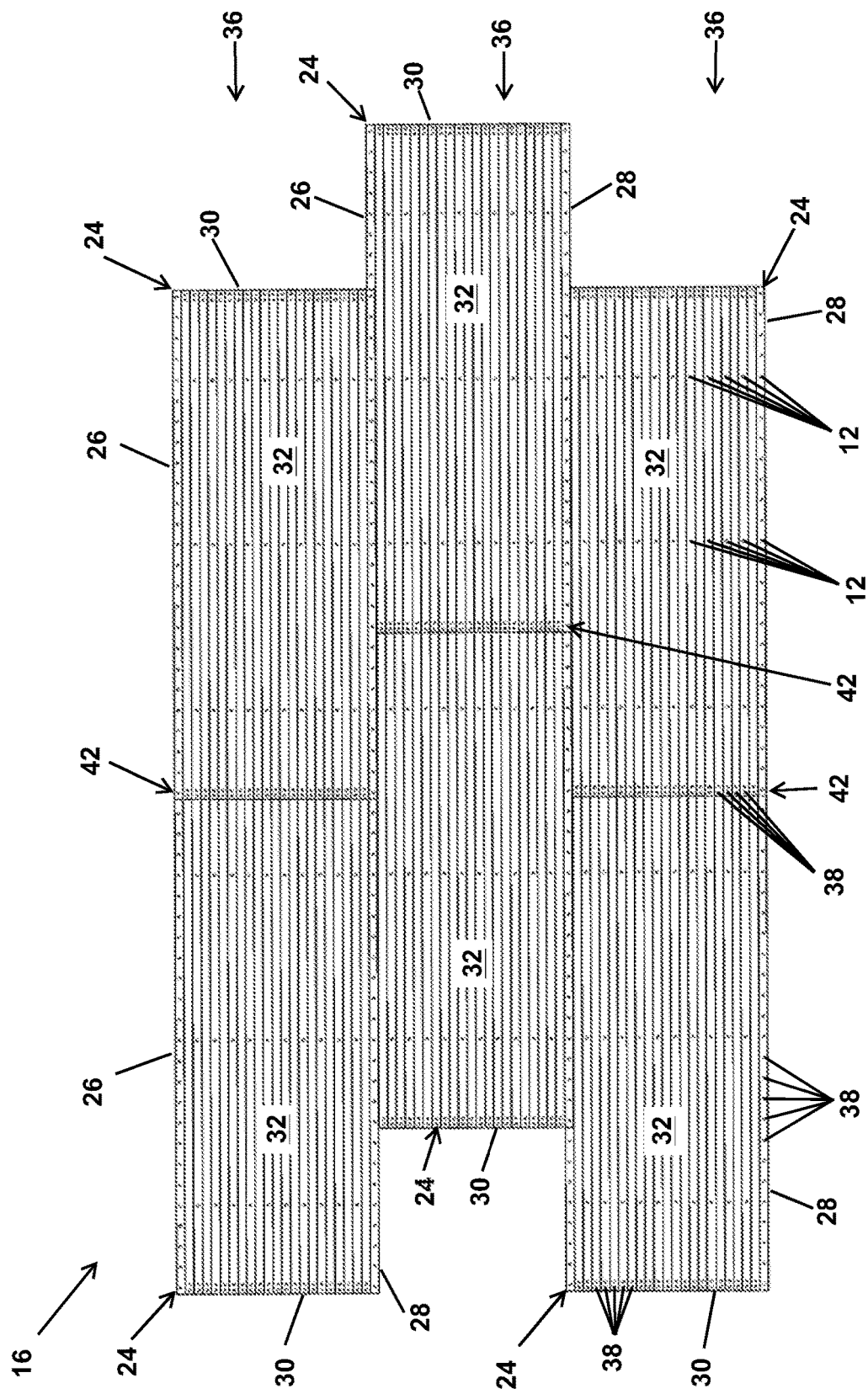
FIG. 2 is a side elevation view of a section of a grain bin sidewall; the view showing a plurality of sheets in staggered overlapping condition; the view showing the plurality of sheets connected to one another at seams at their side edges using sidewall bolts that are conventional bolts having a head and a threaded shaft that are inserted from the outside of the grain bin through the sidewall; the view showing the plurality of sheets forming a plurality of rings that are vertically stacked upon one another to form the sidewall; the view showing lines of stud bolts extending outward from the sidewall spaced away from the seams between adjacent sheets, wherein the lines of stud bolts are configured to receive and hold and affix a stiffener to the exterior surface of the sidewall of the grain bin.
Figure 6:
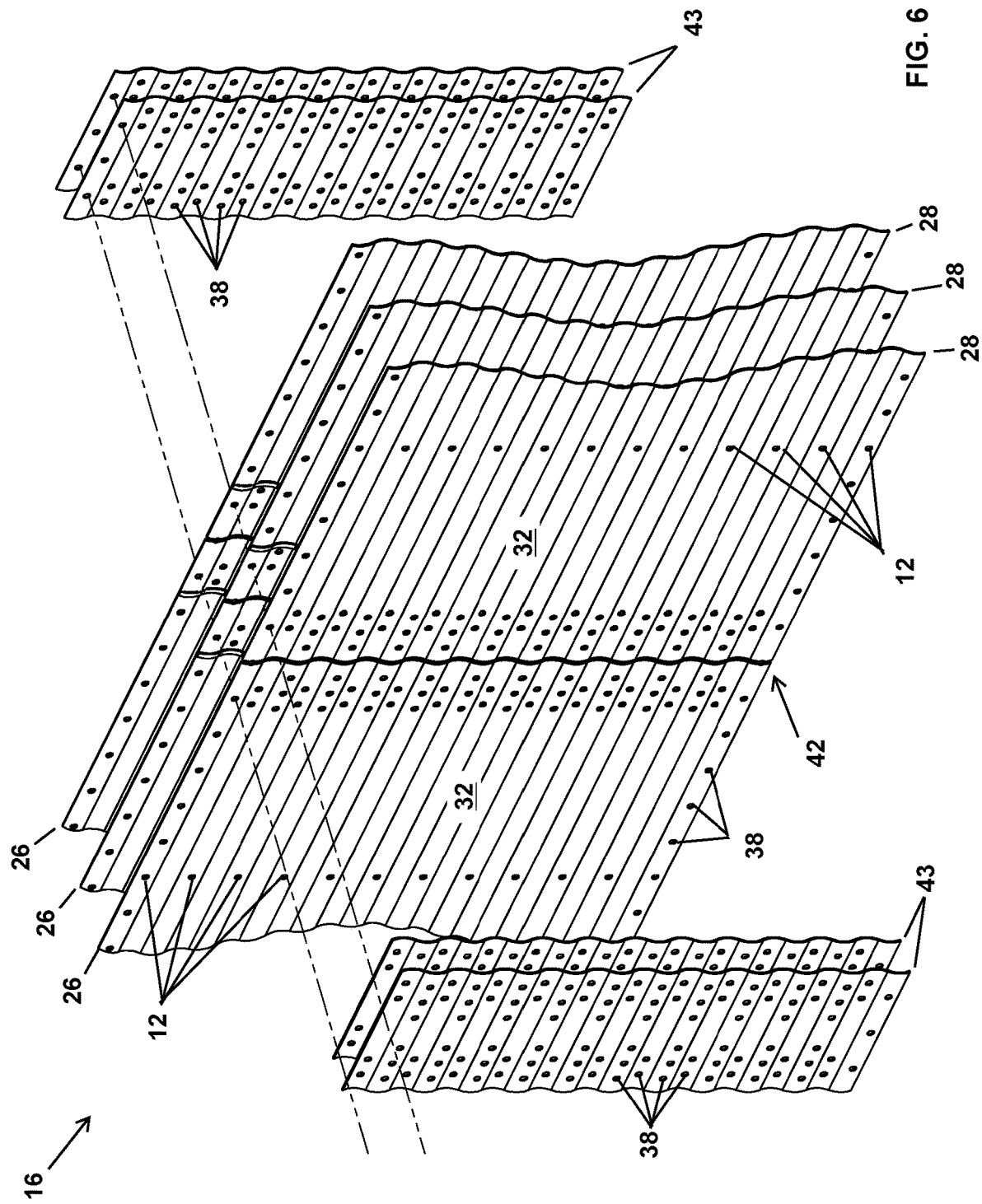
FIG. 6 is an exploded perspective view of a seam between three laminated sheets of grain bin sidewall; the view showing the three sheets in spaced separation from one another; the view showing splice plates in spaced relation to be assembled over the seams on the interior and exterior surface of the sidewall; the view showing rows of holes that are configured to receive stud bolts therein for the attachment of stiffeners on either side of the seams and splice plates.

While rings 36 are vertically stacked, to provide maximum strength, in one arrangement care is taken to offset the seams 42 formed by the overlapping sides edges 30 of adjacent sheets 24. With reference to FIG. 2, these seams 42 are positioned in what is known as a bricklayer's pattern wherein the seams 42 of each vertically stacked ring 36 are offset a predetermined amount from the seams 42 of the ring 36 positioned immediately above and below. However any other arrangement is hereby contemplated for use. As is also shown in FIG. 2, in one arrangement, as one example, stiffeners 14 are connected to sidewall 16 offset from seams 42. In this arrangement, where seams 42 and stiffeners 14 are offset, sidewall bolts 38 are used to connect adjacent sheets 24 at seams 42 as well as connect adjacent rings 36, whereas stud bolts 12 are used to attach stiffeners 14. Attaching stiffeners 42 to sidewall 16 at locations other than seams 42 avoids the added thickness and complexity of attaching a stiffener 14 where adjacent sheets 24 overlap. This is especially true when splice plates 43 are used over seams 42. Splice plates 43 are narrow sections of material that mirror the shape of sidewall 16 and are attached over seams 42 where the side edges 30 of sheets 24 are butted against one another. In the arrangement shown, in FIG. 6, a pair of splice plates 43 are placed on the interior surface 34 and exterior surface 32 of sheets 24 and are attached using sidewall bolts 38. In this arrangement, stiffeners 14 are attached using stud bolts 12 along side seams 42.

Once sidewall 16 of grain bin 18 is formed, stiffeners 14 are attached.

Stiffeners:

Stiffeners 14 are formed of any suitable size, shape and design and are configured to be attached to the exterior surface 32 of the sidewall 16 of grain bin 18 and provide additional strength and rigidity to sidewall 16. As such, stiffener 14 is any structural element that is affixed to the sidewall 16 of grain bin 18 that enhances the strength and/or rigidity of the sidewall 16.

In the arrangement shown, as one example, stiffeners 14 extend a length from an upper edge 44 to a lower edge 46, which in the arrangement shown in FIG. 1 coincides with the upper edge of the upper-most ring 36 and the lower edge of the lower-most ring 36, however any other configuration is hereby contemplated for use. Stiffeners 14 can extend the entire length/height of sidewall 16, such as that shown in FIG. 1, or alternatively, stiffeners 14 can extend any portion of sidewall 16. In the arrangement shown, stiffeners 14 provide strength and rigidity to grain bin 18 in-part by extending across multiple rings 36.

As one example, as is shown, stiffeners 14 have in exterior surface 48, that faces outward and away from the exterior surface of sidewall 16 of grain bin 18, and an interior surface 50 that faces inward and toward the sidewall 16 of grain bin 18. In the example shown, stiffener 14 includes a center wall 52, opposing side members 54, forward walls 56 and tabs 58. Center wall 52 is generally flat and planar and extends from upper edge 44 to lower edge 46, or a distance thereof. Center wall 52 includes a plurality of vertically spaced holes 60 positioned approximately at its center. These holes 60 are configured to receive a portion of stud bolt 12 there through to facilitate attachment of the stiffener 14 to the sidewall 16 of grain bin 18 as is further described herein.

As one example, as is shown the outward edges of center wall 52 are connected to opposing side members 54. Like center wall 52, side members 54 are generally flat and planar and extend from upper edge 44 to lower edge 46, or a distance thereof. Side members 54 connect at their rearward edge 62 to the outward edge of center wall 52, and connect at their forward edge 64 to the inward edge of forward wall 56. Side members 54 extend outward at an angle away from one another (and away from center wall 52) as they extend from center wall 52 to forward wall 56.

The forward edges 64 of side members 54 are connected to the inward edges of forward walls 56. Like center wall 52, forward walls 56 are generally flat and planar and extend from upper edge 44 to lower edge 46, or a distance thereof. In the arrangement shown, opposing forward walls 56 are positioned in approximate planar spaced relation to one another, and forward walls 56 are positioned in approximate parallel spaced relation to center wall 52. Forward walls 56 connect at their outward edges 66 to the forward edge of tabs 58.

As one example, as is shown the forward edges of tabs 58 connect to the outward edges 66 of tabs 58. Like center wall 52, tabs 58 are generally flat and planar and extend from upper edge 44 to lower edge 46, or a distance thereof. In the arrangement shown, tabs 58 extend outward at an angle away from one another (and away from center wall 52 while extending toward sidewall 16) as they extend from their forward edge before terminating at their rearward edge 68.

In this way, the combination of center wall 52, side members 54, forward walls 56 and tabs 58 form a structural element that provides additional strength and rigidity when connected the sidewall 16 of grain bin 18. When viewed from above or below, the combination of center wall 52, side members 54, forward walls 56 and tabs 58 essentially form corrugation, like that of sidewall 16 of grain bin 18 that provides strength and rigidity. While stiffener 14 is shown having center wall 52, side members 54, forward walls 56 and tabs 58, this is just one of countless examples for the design of stiffener 14, and any other features or combination of features are hereby contemplated for use with stiffener 14.

Like sheets 24 of sidewall 16 of grain bin 18, stiffener 14 may be formed of a plurality of layers, or "laminated" to provide additional strength and rigidity. In addition, just as the sidewall 16 is formed of a plurality of sheets 24, stiffeners 14 that extend the length of sidewall 16 may be formed of a plurality of sections that are connected together in end-to-end connection and/or in overlapping condition.

Figure 9A:
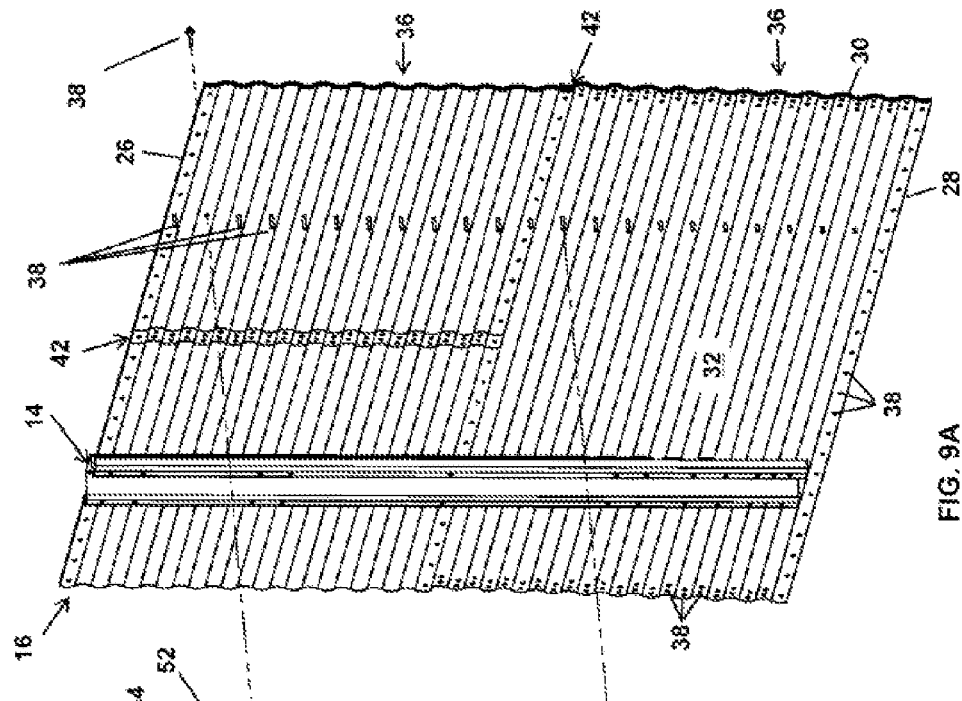
FIG. 9A is a perspective view of a prior art section of grain bin sidewall; the view showing a stiffener connected to the exterior surface of the grain bin sidewall and another stiffener about to be installed on the grain bin sidewall using sidewall bolts that are extended from the interior of the grain bin outward through the sidewall and through the stiffener; the view showing outer nuts that are configured to connect to the threaded end of sidewall bolts after the stiffener is placed over the sidewall bolts.

Conventional Attachment of Stiffener to Sidewall:

With reference to FIGS. 8 and 9, conventionally, stiffener 14 is attached to the exterior surface 32 of sidewall 16 of grain bin 18 by inserting a conventional sidewall bolt 38 having a head and a threaded shaft from the interior surface 34 of sidewall 16, through sidewall 16 and through a hole in stiffener 14. A nut is then placed on the outward end of the threaded shaft of the sidewall bolt 38 on the exterior of sidewall 16 and stiffener 14. This nut is then tightened against the exterior surface 48 of stiffener 14. Upon tightening, the head of this sidewall bolt 38 seals against the interior surface 34 of sidewall 16. In some arrangements a sealing member, such as a compressible washer, may be placed between the head of the sidewall bolt 38 and the interior surface 34 of sidewall 16. In this arrangement, the sealing member forms the seal between the head of sidewall bolt 38 and interior surface 34 of sidewall 16.

However, when laminated sheets 24 are used, sealing the head of this sidewall bolt 38 to the interior surface 34 of grain bin 18 does not prevent water from entering the grain bin 18. Instead, this merely forces water that travels along the shaft of this sidewall bolt 38 to be diverted into the space between layers of the laminated sheet 24. Some of this water finds its way out the lower edge 28 of the sheet 24 (which is positioned in front of the upper edge 44 of the adjacent lower ring 36), and therefore not into the interior of the grain bin 18. Some of this water also finds its way out of the exterior positioned side edge 30E (which is positioned in front of the adjacent sheet 24 in the same ring 36), and therefore this water does not enter into the interior of the grain bin 18. However, some of this water finds its way out of the interior positioned side edge 30I (which is positioned in behind the adjacent sheet 24 in the same ring 36), and therefore this water enters into the interior of the grain bin 18. This interior positioned side edge 30I may be referred to as the "leaking edge" or "seeping edge" of laminated sheet 24 of rings 36 of sidewall 16.

Figure 8A:
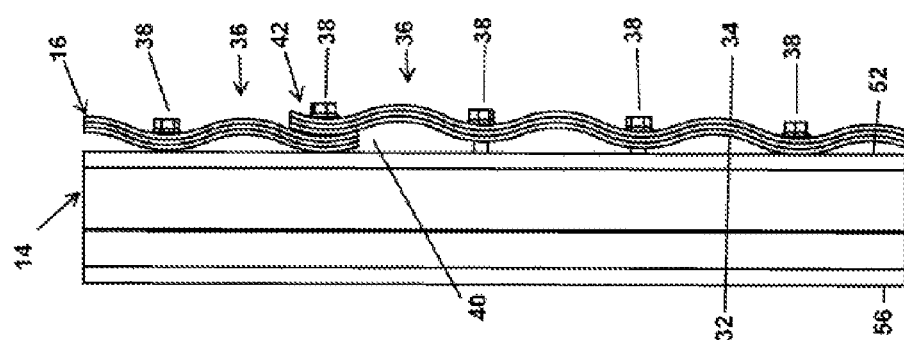
FIG. 8A is a side cut-away elevation view of a prior art sidewall of a grain bin with a stiffener connected to the exterior surface of the sidewall; the view also showing two rings overlapping one another thereby forming a step below the seam; the view showing sidewall bolts extending from the interior of the grain bin outward through the sidewall and through the stiffener; the view showing a gap between the exterior surface of the sidewall and the interior surface of the stiffener on the two sidewall bolts positioned just below the step thereby exposing a portion of the threads of these sidewall bolts that provide water an access point into the grain bin.
Figure 10:
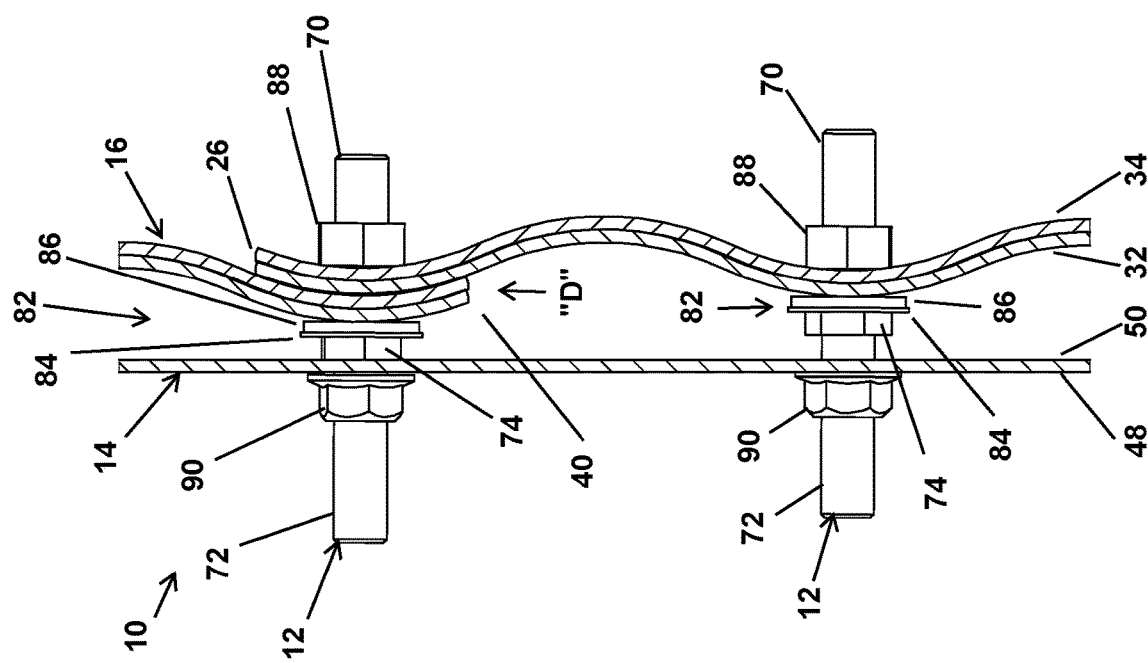
FIG. 10 is a side cut-away elevation view of the sidewall of a grain bin; the view showing two rings overlapping one another; the view showing two 7/16" stud bolts connecting an external stiffener to the exterior surface of the grain bin; the view showing a single twelve gauge stiffener and two layers of thirteen gauge sidewall material in a laminated state; the view showing a sealing member compressed between the feature, which in this case is a hex-head feature, and the exterior surface of the grain bin sidewall thereby forming a seal regardless whether a gap is between the interior surface of the stiffener and the exterior surface of the sidewall; the view showing a gap between the interior surface of the stiffener and the exterior surface of the feature of the lower stud bolt.
Figure 11:
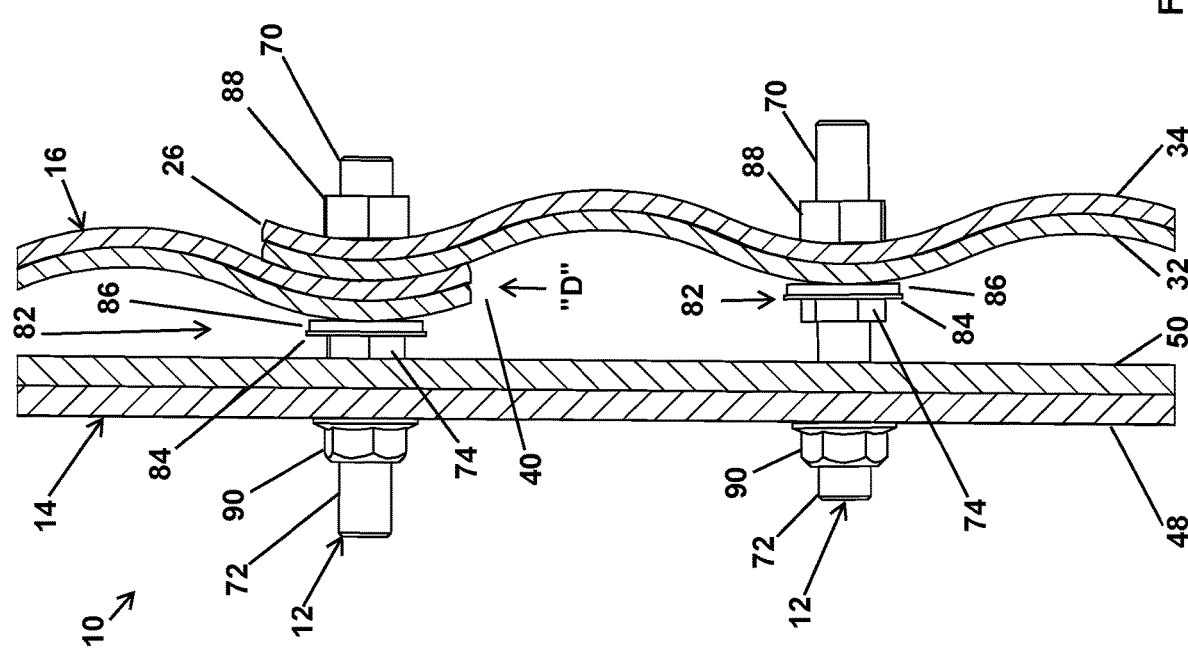
FIG. 11 is a side cut-away elevation view of the sidewall of a grain bin; the view showing two rings overlapping one another; the view showing two 7/16" stud bolts connecting an external stiffener to the exterior surface of the grain bin; the view showing a two overlapping two gauge stiffeners and two layers of eight gauge sidewall material in a laminated state; the view showing a sealing member compressed between the feature, which in this case is a hex-head feature, and the exterior surface of the grain bin sidewall thereby forming a seal regardless whether a gap is between the interior surface of the stiffener and the exterior surface of the sidewall; the view showing a gap between the interior surface of the stiffener and the exterior surface of the feature of the lower stud bolt.
Figure 12:
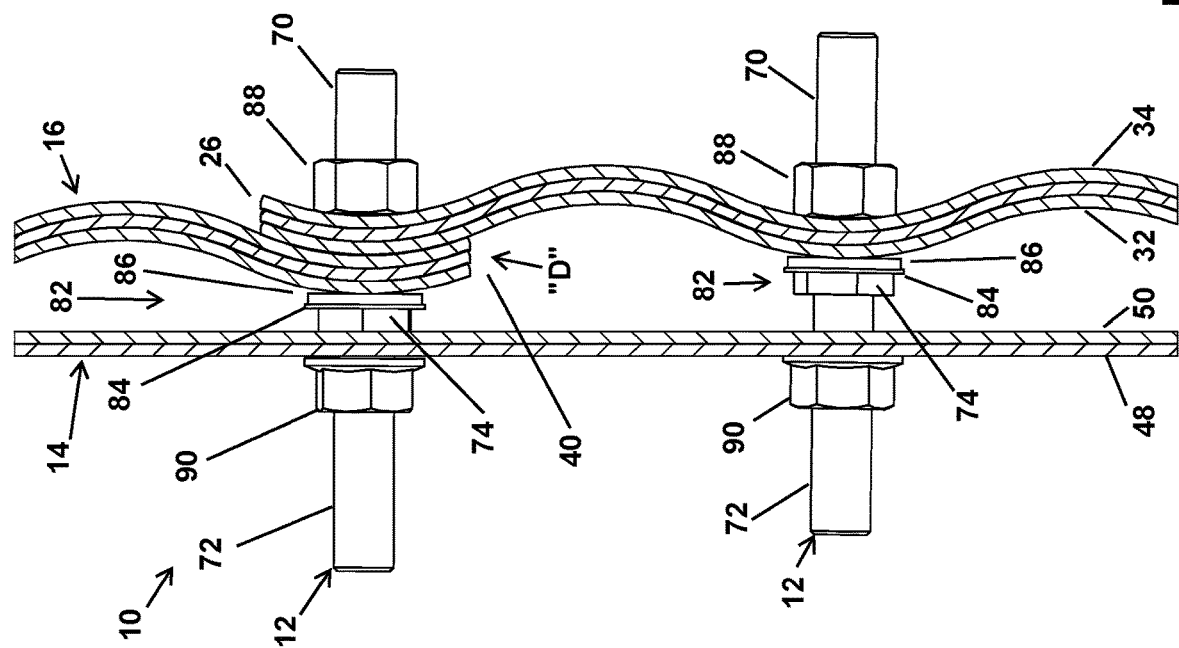
FIG. 12 is a side cut-away elevation view of the sidewall of a grain bin; the view showing two rings overlapping one another; the view showing two ½" stud bolts connecting an external stiffener to the exterior surface of the grain bin; the view showing a two overlapping ten gauge stiffeners and three layers of eleven gauge sidewall material in a laminated state; the view showing a sealing member compressed between the feature, which in this case is a hex-head feature, and the exterior surface of the grain bin sidewall thereby forming a seal regardless whether a gap is between the interior surface of the stiffener and the exterior surface of the sidewall; the view showing a gap between the interior surface of the stiffener and the exterior surface of the feature of the lower stud bolt.
Figure 13:
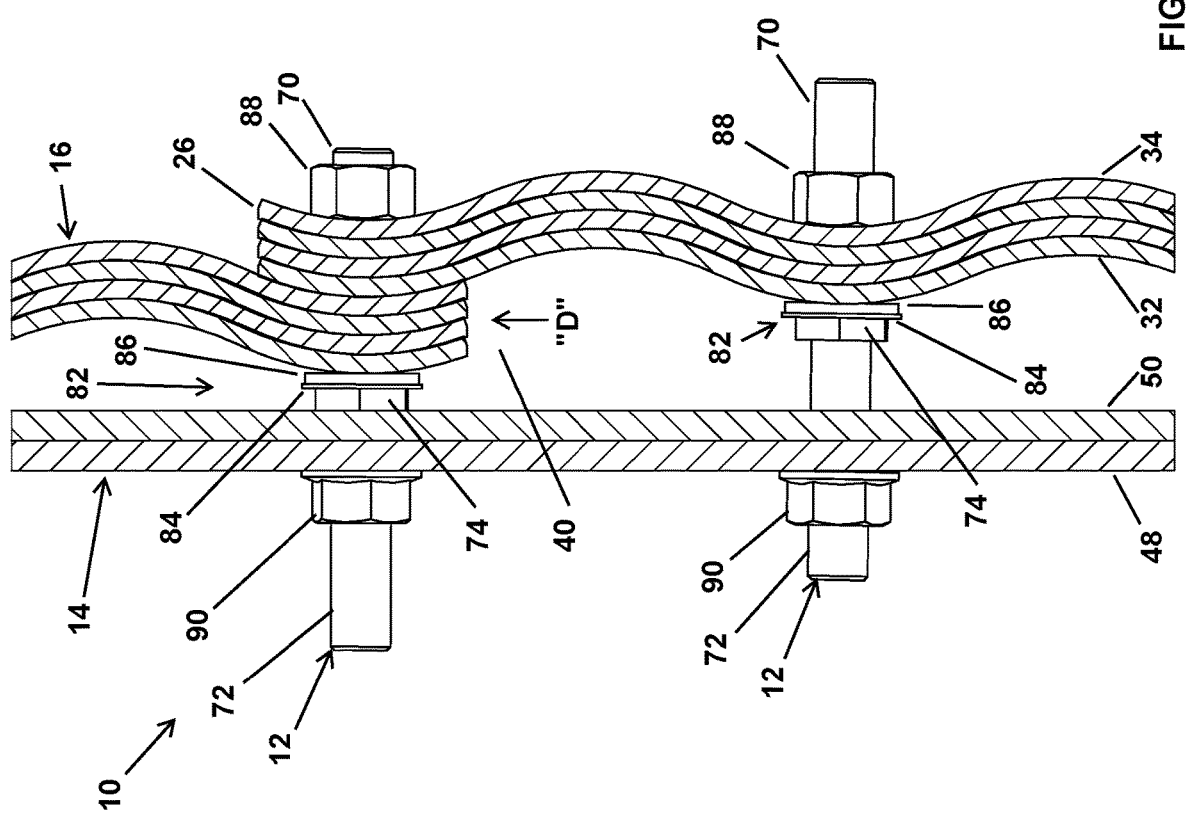
FIG. 13 is a side cut-away elevation view of the sidewall of a grain bin; the view showing two rings overlapping one another; the view showing two ½" stud bolts connecting an external stiffener to the exterior surface of the grain bin; the view showing a two overlapping two gauge stiffeners and four layers of eight gauge sidewall material in a laminated state; the view showing a sealing member compressed between the feature, which in this case is a hex-head feature, and the exterior surface of the grain bin sidewall thereby forming a seal regardless whether a gap is between the interior surface of the stiffener and the exterior surface of the sidewall; the view showing a gap between the interior surface of the stiffener and the exterior surface of the feature of the lower stud bolt.

This problem is particularly prevalent, or is exacerbated, where a space is present between the interior surface 50 of stiffener 14 and the exterior surface 32 of sidewall 16 even after tightening the nut against the exterior surface 48 of center wall 52 of stiffener 14. Such a space is often present just below the step 40 between rings 36 in sidewall 16 as in these places the stiffener 14 cannot be drawn tight against the sidewall 16 of grain bin 18. The exposed shaft of the sidewall bolt 38 and the associated un-sealed hole in the exterior surface 32 of sidewall 16 provides a path for water to enter into the laminated sheet 24. This arrangement is shown in FIG. 8A wherein the two sidewall bolts 38 positioned just below the step 40 between overlapping rings 36 have an exposed portion of the shaft of sidewall bolts 38 between the interior surface 52 of stiffener 14 and the exterior surface 32 of sidewall 16.

The arrangement presented herein using stud bolt 12, resolves this problem.

Stud Bolt:

Stud bolt 12 is formed of any suitable size, shape and design and is configured to tighten against the exterior surface 32 of sidewall 16 of grain bin 18 while also pulling stiffener 14 into firm engagement with the sidewall 16 of grain bin 18. The use of stud bolt 12 ensures that a seal is formed with the exterior surface 32 of sidewall 16 of grain bin 18 regardless of whether the interior surface 50 of stiffener 14 can be drawn tight against the exterior surface 32 of sidewall 16 of grain bin 18.

In the arrangement shown, as one example, stud bolt 12 is a generally cylindrical elongated member having a first threaded end 70 and a second threaded end 72. First threaded end 70 and second threaded end 72 are positioned in coaxial alignment with one another. That is, the center axis of rotation of first threaded end 70 and second threaded end 72 are in alignment with one another, despite the fact that the diameters or shapes or features of the first threaded end 70 and second threaded end 72 may differ. In the arrangement shown, a feature 74 is positioned between the first threaded end 70 and the second threaded end 72. First threaded end 70 and second threaded end 72 may have the same diameter, or different diameters. First threaded end 70 and second threaded end 72 may have the same length, or different lengths. First threaded end 70 and second threaded end 72 may have the same threads, or different threads.

Feature 74 is formed of any suitable size, shape and design. Feature 74 serves to engage the exterior surface 32 of sidewall 16 of grain bin 18 as the first threaded end 70 is tightened against the sidewall 16. Feature 74 may be formed of that same material as that of the first threaded end 70 and/or second threaded end 72 in a monolithic or unitary structure, such as being formed through a machining process or casting process or the like manufacturing process. Alternatively, feature 74 may be a separate component to the shaft formed by first threaded end 70 and second threaded end 72 that is affixed thereto by a secondary process to form a unitary member, such as through a welding process, a pinning process, a bolting process, an adhering process, a gluing process or by any other process that results in a permanent or semi-permanent connection between a separate feature 74 and the shaft formed by first threaded end 70 and second threaded end 72. Alternatively, feature 74 may be attached to the first threaded end 70 and/or the second threaded end 74 while being moveable along all or a portion of the length of the stud bolt 12. In one arrangement, this is accomplished by feature 74 being a nut or other member that is threaded over first threaded end 70 and/or second threaded end 72. Alternatively, any combination of the above is contemplated for use.

Figure 16:
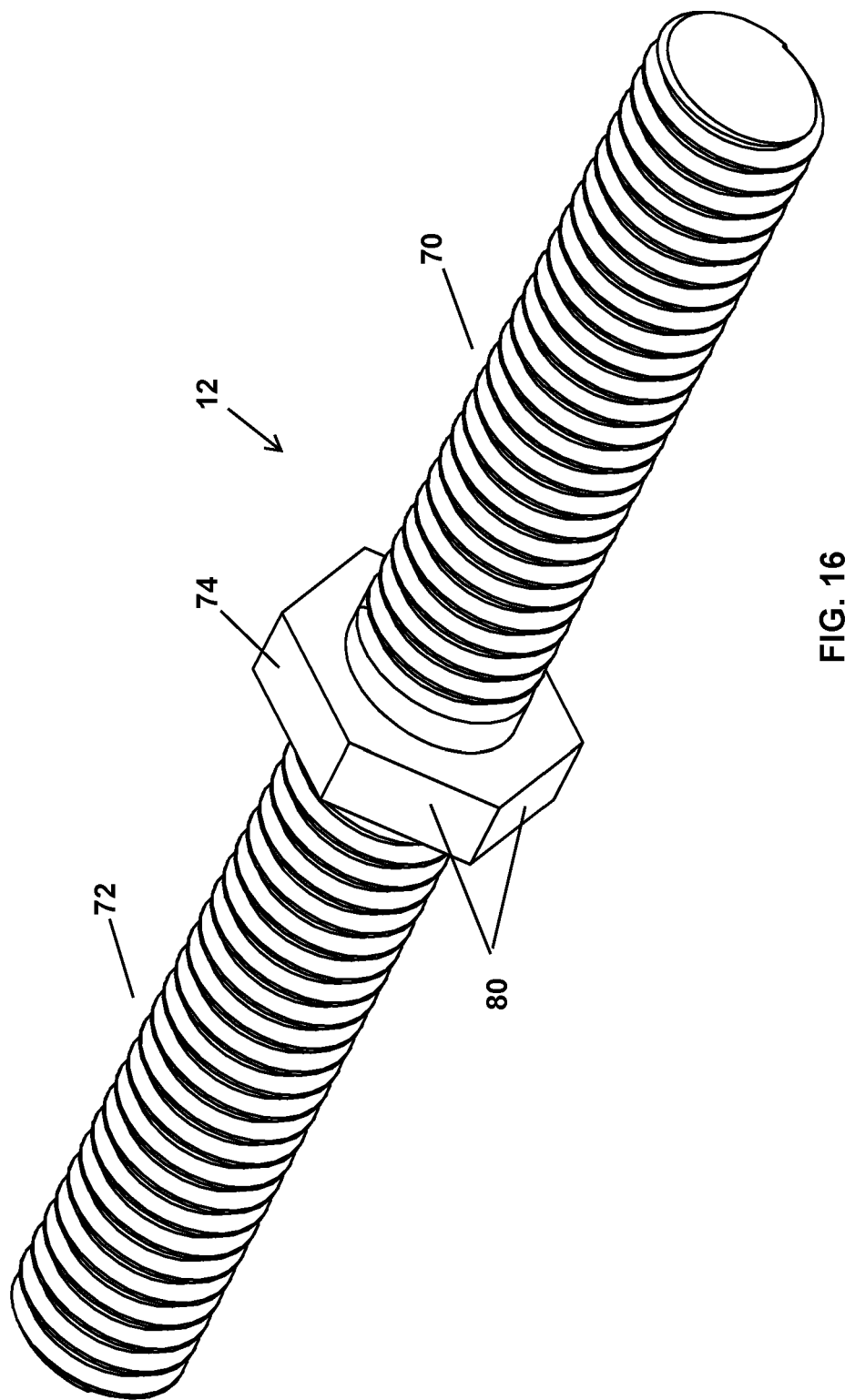
FIG. 16 is a perspective view of a stud bolt having a first threaded end and a second threaded end and a feature positioned between first threaded end and a second threaded end, the feature having a hexagonal or hex-head shape; the view showing the feature formed as part of the stud bolt in a unitary and monolithic manner.

With reference to FIGS. 14-16, as one example of a stud bolt 12, feature 74 is formed of a hexagonal, or hex-head member that is positioned approximately in the middle of stud bolt 12 between first threaded end 70 and second threaded end 72, which are of approximately the same length, diameter and thread. The use of a hex-head member for feature 74 allows for the use of a conventional deep socket or wrench during the assembly process to hold or rotate the stud bolt 12. In an alternative arrangement, the length of the first threaded end 70 and second threaded end 72 vary such that feature is not positioned in the approximate middle of the stud bolt 12. In an alternative arrangement, the first threaded end 70 and second threaded end 72 vary in diameter, such that one end has a larger diameter than the other end. In an alternative arrangement, the first threaded end 70 and second threaded end 72 have different threads. Any other differences between the first threaded end 70 and second threaded end 72 are hereby contemplated for use.

In one arrangement, as is shown, in FIGS. 14-16, feature 74 is formed of as a unitary and monolithic member with the shaft formed by first threaded end 70 and second threaded end 72 such that the feature 74 is non-moveable along the length of stud bolt 12. In an alternative arrangement, feature 74 is threaded onto shaft formed by first threaded end 70 and/or second threaded end 72 or otherwise connected in a moveable manner. In an alternative arrangement, feature 74 is a separate member from the shaft formed by first threaded end 70 and/or second threaded end 72 and is affixed by a secondary process to form a unitary member, such as through a welding process, a pinning process, a bolting process, an adhering process, a gluing process or by any other process that results in a permanent or semi-permanent connection between a separate feature 74 and the shaft formed by first threaded end 70 and/or second threaded end 72

Figure 17:
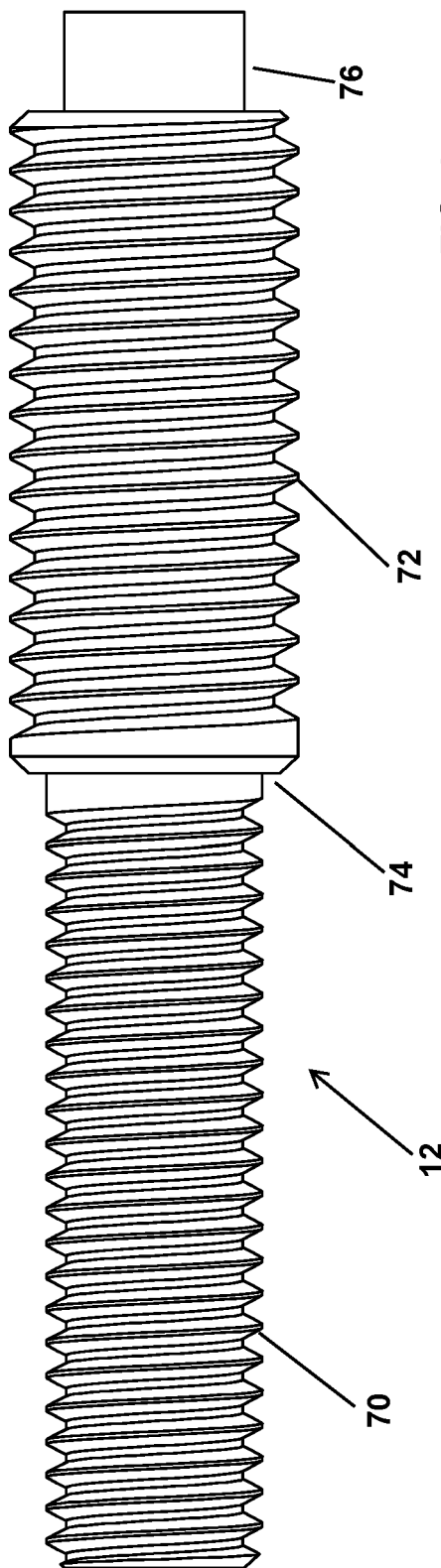
FIG. 17 is a side elevation view of a stud bolt having a first threaded end and a second threaded end and a feature positioned between first threaded end and a second threaded end, wherein the feature is a step or shoulder; the view also showing a rotation member positioned in an end of the stud bolt, the rotation member having a circular shape with opposing flat sides; the view showing the feature formed as part of the stud bolt in a unitary and monolithic manner; the view showing the first threaded end having a smaller diameter than the second threaded end.
Figure 18:
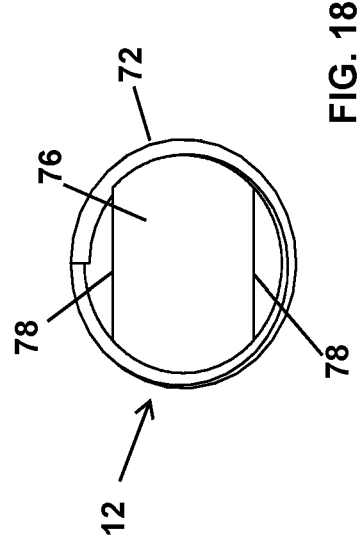
FIG. 18 is an end elevation view of a stud bolt having a first threaded end and a second threaded end and a feature positioned between first threaded end and a second threaded end, wherein the feature is a step or shoulder; the view also showing a rotation member positioned in an end of the stud bolt, the rotation member having a circular shape with opposing flat sides; the view showing the first threaded end having a smaller diameter than the second threaded end.
Figure 19:
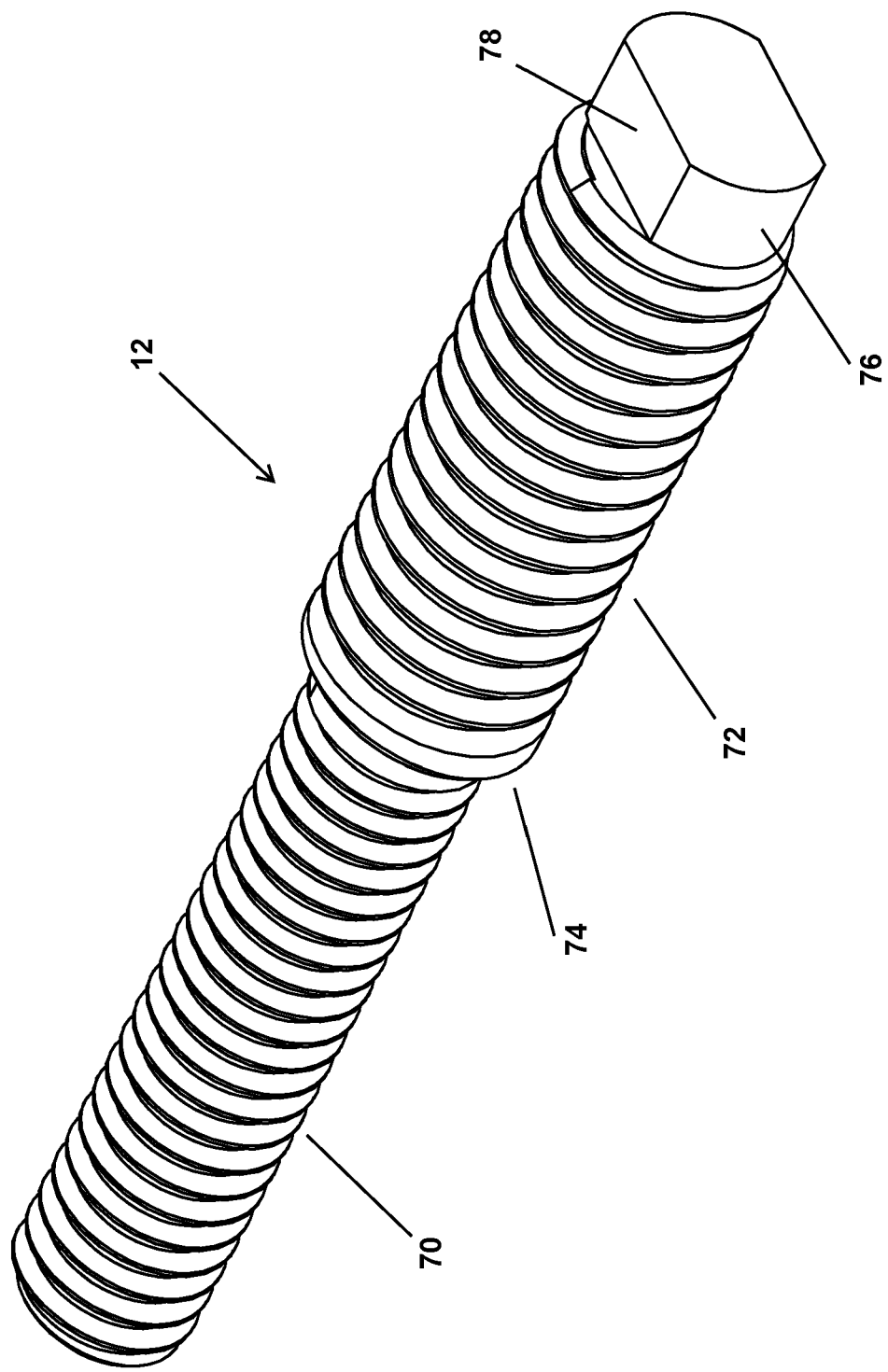
FIG. 19 is a perspective view of a stud bolt having a first threaded end and a second threaded end and a feature positioned between first threaded end and a second threaded end, wherein the feature is a step or shoulder; the view also showing a rotation member positioned in an end of the stud bolt, the rotation member having a circular shape with opposing flat sides; the view showing the feature formed as part of the stud bolt in a unitary and monolithic manner; the view showing the first threaded end having a smaller diameter than the second threaded end.

With reference to FIGS. 17-19, as another example of a stud bolt 12, feature 74 is formed of a step or shoulder positioned between a smaller diameter first threaded end 70 and a larger diameter second threaded end 72. Also shown in this example is a rotation member 76 positioned in the end of the second threaded end 72. Rotation member 76 is any feature or device that allows for the stud bolt 12 to be grasped and rotation to be imparted on the stud bolt 12. In the arrangement shown, as one example, rotation member 76 is generally cylindrical in shape and has a diameter slightly smaller than the diameter of the second threaded end 72. This rotation member 76 includes a pair of flat surfaces 78 on opposing sides of the rotation member 76. These flat surfaces 78 allow for a wrench or other tool to grasp the rotation member 76 and impart torque there on. This can be useful during the installation process. It is hereby contemplated for use that rotation member 76 can take on any other form, such as a hex-head member, a square head member, a recessed hexagonal socket, a recessed square socket, a recessed flat head feature that receives a flat head screw driver, a recessed Philips head feature that receives a Phillips head screw driver, a slot, a pair of crossed slots, or any other feature that can be used to impart rotation. In this arrangement, when the first threaded end 70 is inserted within sidewall 16, the second threaded end 72 and the rotation member 76 extend outward from the sidewall 16 thereby facilitating easy access to the rotation member 76. In this arrangement, once the first threaded end 70 is inserted into the sidewall 16 of grain bin 18, a tool grasps the rotation member 76 thereby imparting rotation on stud bolt 12 or preventing rotation of stud bolt 12.

While in the arrangement shown, in FIGS. 17-19, rotation member 76 is shown as positioned on one end of the stud bolt 12, it is hereby contemplated that rotation member 76 may be placed on either end or both ends of the stud bolt 12, or along the length of stud bolt 12.

Figure 20:
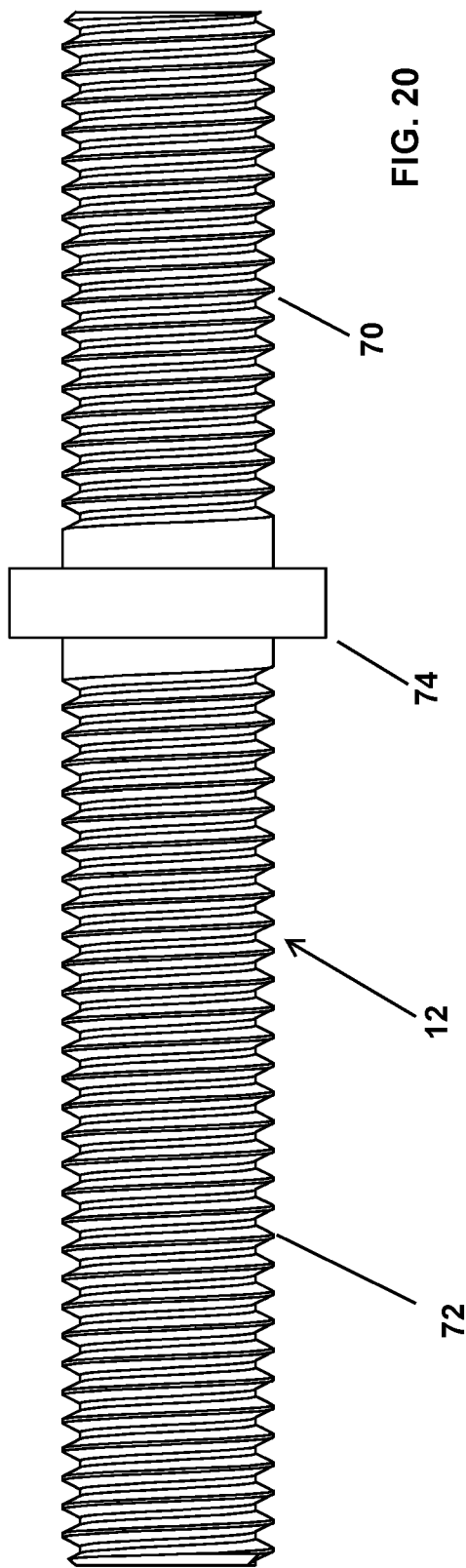
FIG. 20 is a side elevation view of a stud bolt having a first threaded end and a second threaded end and a feature positioned between first threaded end and a second threaded end, the feature having a circular shape with opposing flat sides; the view showing the feature formed as part of the stud bolt in a unitary and monolithic manner.
Figure 21:
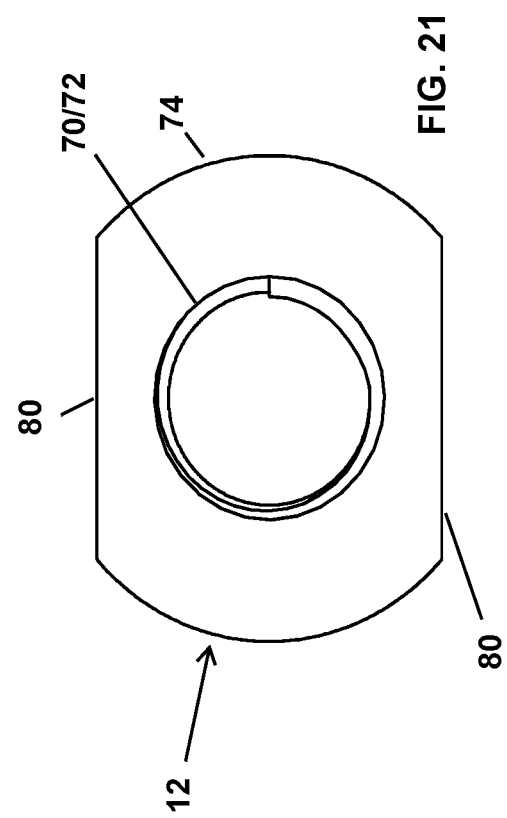
FIG. 21 is an end elevation view of a stud bolt having a first threaded end and a second threaded end and a feature positioned between first threaded end and a second threaded end, the feature having a circular shape with opposing flat sides.
Figure 22:
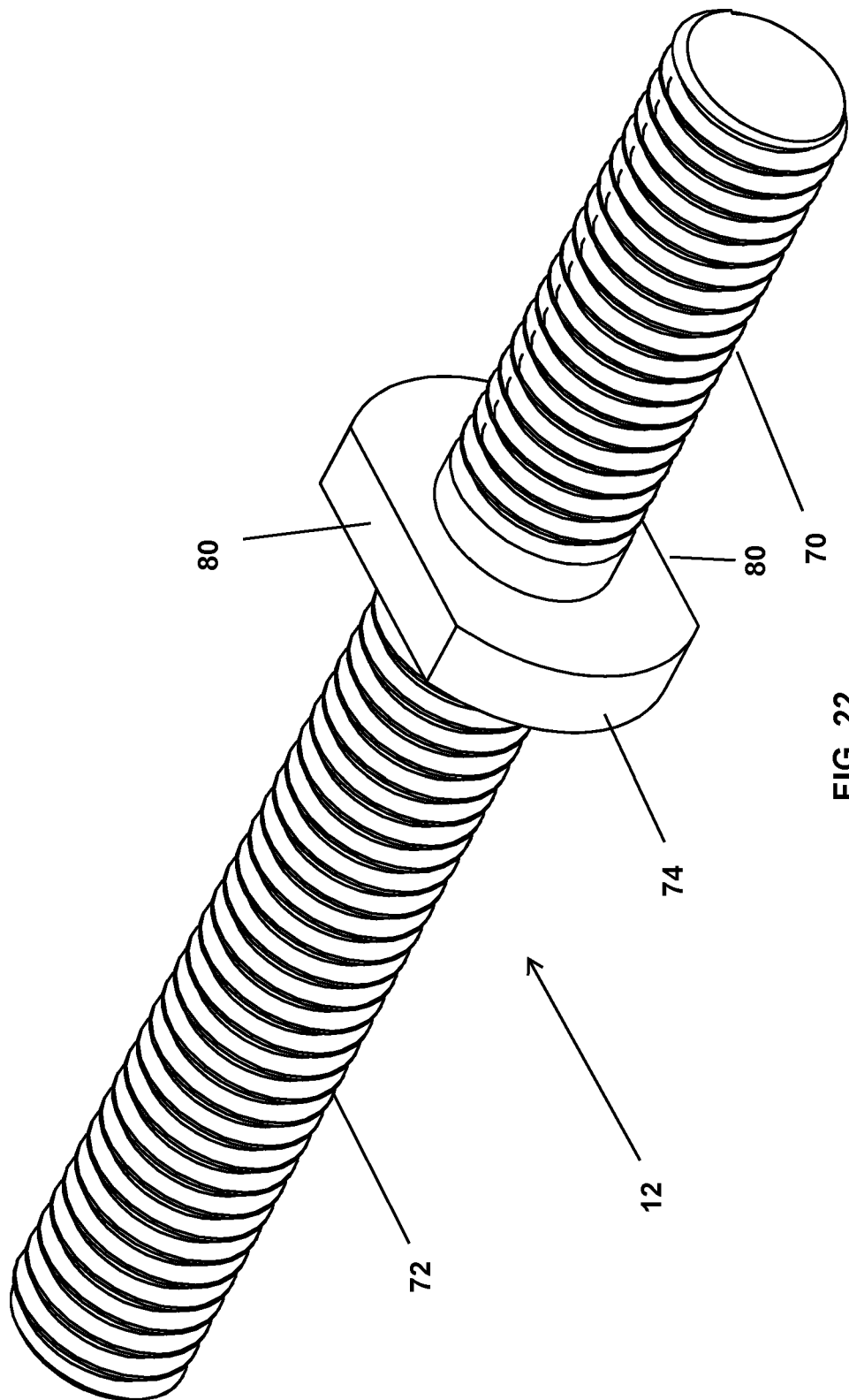
FIG. 22 is a perspective view of a stud bolt having a first threaded end and a second threaded end and a feature positioned between first threaded end and a second threaded end, the feature having a circular shape with opposing flat sides; the view showing the feature formed as part of the stud bolt in a unitary and monolithic manner.
Figure 23:
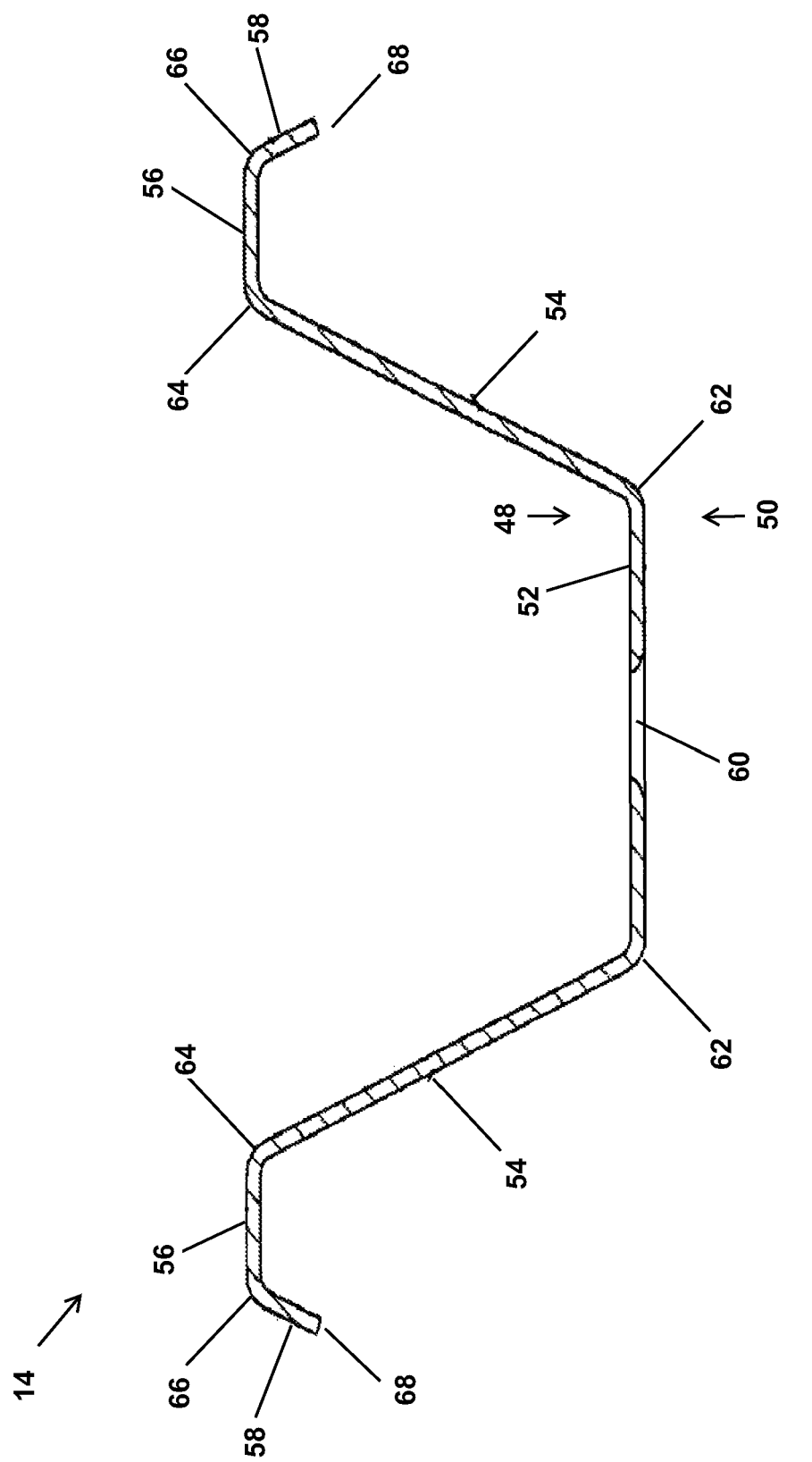
FIG. 23 is a top elevation view of a stiffener, the view showing the center wall, side members, forward wall, tabs and holes of the stiffener.

With reference to FIGS. 20-22, as another example of a stud bolt 12, feature 74 is formed of a generally circular or cylindrical flange member that is positioned between first threaded end 70 and second threaded end 72, with the first threaded end 70 and the second threaded end 72 having approximately the same diameter and thread. However, the second threaded end 72 is longer than the first threaded end 70 in this example. In the arrangement shown, the feature 74 has a generally cylindrical or disc-shaped design with a pair of opposing flat surfaces 80 positioned on opposite sides of the feature 74. These flat surfaces 80 allow for a wrench or other tool to grasp the feature 74 and impart torque there on. This can be useful during the installation process to facilitate holding the stud bolt 12 in place or to impart rotation upon stud bolt 12.

Stud bolt 12 can be formed of any other suitable size, shape and design. Stud bolt 12 is used to tighten a sealing member 82 against the exterior surface 32 and/or interior surface 34 of sidewall 16 of grain bin 18 thereby forming a seal against sidewall 16. Stud bolt 12 may be formed of any combination of any or all of the configurations or features mentioned herein.

Sealing Member:

Sealing member 82 is formed of any suitable size, shape and design and is configured to form a seal against the exterior surface 32 and/or interior surface 34 of sidewall 16 of grain bin 18 to thereby prevent water from entering the interior of grain bin 18. Sealing member 82 is any device that forms a seal, such as a compressible washer, an O-ring, a gasket, a sealing adhesive layer, a compressible member, a flange gasket, or the like. Sealing member 82 may be formed of any compressible material that is capable of forming a seal with the exterior surface 32 and/or interior surface 34 of sidewall 16, such as rubber, plastic, composite, nylon washer, neoprene, a poly, or any other compressible material and/or combination thereof.

In the arrangement shown, as one example, sealing member 82 includes a rigid washer 84 and a compressible member 86 that fit around the first threaded end 70 of the stud bolt 12. In one arrangement, rigid washer 84 and compressible member 86 are separate and unattached components. In another arrangement, rigid washer 84 and compressible member 86 are adhered or connected to one another and/or formed as a single component, which reduces assembly steps and reduces the potential that the components will be unintentionally separated from one another during or prior to the installation process.

In another arrangement, the rigid washer 84 is eliminated and the feature 74 serves as the rigid washer 84 that forces the compressible member 86 into engagement with the exterior surface 32 and/or interior surface 34 of the sidewall 16 of grain bin 18. In yet another arrangement, the rigid washer 84 is formed as part of the feature 74 and the compressible member 86 is either a separate piece from this combined feature 74 and rigid washer 84, or is adhered to or connected to or formed as part of this combined feature 74 and rigid washer 84. That is, in one arrangement, feature 74 is a hex-shaped, or other shaped, member like many conventional nuts with an extended flange or washer formed as part of one end of the feature 74; this feature 74 with the combined flange or washer may be formed as part of the stud bolt 12 or it may be added as a separate nut-type member that is placed on the stud bolt 12. In one arrangement, feature 74 includes a recess therein, such as a groove that facilitates connection to compressible member 86, such as receiving a compressible O-ring therein or receiving a flange of a gasket therein that holds the compressible member 86 to the feature 74.

In Operation:

In one arrangement, sidewall 16 of grain bin 18 is assembled by connecting sheets, 24, which may be laminated sheets formed of a plurality of layers, in edge-to-edge alignment to form rings 36. This arrangement is shown in FIG. 3 wherein one side edge 30 of sheet 24 is positioned behind an adjacent sheet 24 making this side edge 30 the interior side edge 30I, whereas the opposite side edge 30 of sheet 24 is positioned in front of the other adjacent sheet 24 making this side edge 30 the exterior side edge 30E. In one arrangement, as is shown, rings 36 are formed by inserting side sidewall bolts 38 through the sheets 24 which when tightened the head and sealing member of the sidewall bolt 38 forms a seal with the exterior surface 32 of the sheet. As the rings 36 are formed, care is taken to ensure that the lower edge 28 of sheets 24 of an upper-positioned ring 36 is positioned outside of the upper edge 26 of sheets 24 of the lower-positioned ring 36 at which point sidewall bolts 38 are inserted through the overlapping sheets 24 which when tightened the head and sealing member of the sidewall bolt 38 forms a seal with the exterior surface 32 of the sheet. Care is also taken when assembling vertically adjacent rings to ensure that the seams 42 of vertically adjacent rings 36 are offset from one another. Typically, grain bin 18 is assembled in a top-down manner with the assembly of roof 22 followed by the assembly of consecutive rings 36.

Once some or all of the rings 36 are assembled, stiffeners 14 are added to the exterior surface 32 of sidewall 16 using stud bolts 12. If stud bolts 12 are not pre-assembled with sealing member 82, which may be formed of a rigid washer 84 and a compressible member 86 thereon, the sealing member 82 is placed on the first threaded end 70 of stud bolts 12. Assembled stud bolts 12 are then installed on the sidewall 16. The first threaded end 70 of the stud bolt 12 is inserted into a hole in the sidewall 16. Next, an inner nut 88 is threaded onto the end of the first threaded end 70 of the stud bolt 12 on the inside of sidewall 16 within grain bin 18. The inner nut 88 is then tightened against the interior surface 34 of the sidewall 16 thereby pulling the feature 74 of the stud bolt 12 toward the exterior surface 32 of the sidewall 16. As the inner nut 88 is tightened, the feature 74 forces the sealing member 82 into tight frictional engagement with the exterior surface 32 of sidewall 16 thereby forming a water tight seal preventing water from entering the hole in sidewall 16 through which the first threaded end 70 of stud bolt 12 is inserted. This seal further prevents water from getting between the layers of the laminated sheet 24. As the inner nut 88 is tightened, the rigid washer 84 disperses the force across the compressible member 86 thereby providing a broad, consistent and durable seal by dispersing the force across a greater surface area. In one arrangement, a sealing member 82 is also positioned on the interior surface 34 of sidewall 16 as well in a similar if not identical manner as is described herein. However in many arrangements, when water is prevented from entering the exterior surface 32 of sidewall 16 it is unnecessary or of minimal benefit to seal the interior surface 34 of the hole that receives stud bolt 12 therein.

Also, as the inner nut 88 is tightened against the interior surface 34 of sidewall 16, the compression between feature 74 and inner nut 88 brings the layers of the laminated sheet into tight and rigid connection with one another. This increases the strength and rigidity of the sidewall 16.

When inner nut 88 and/or stud bolt 12 are tightened against one another, in one arrangement, the features 74 of stud bolt 12 and/or the rotation member 76 of stud bolt 12 are used to hold the stud bolt 12 in place and prevent rotation as the inner nut 88 is installed on the first threaded end 70. Alternatively, when inner nut 88 and/or stud bolt 12 are tightened against one another, in one arrangement, the features 74 of stud bolt 12 and/or the rotation member 76 of stud bolt 12 are used to rotate the stud bolt 12 as the inner nut 88 is held in place.

This process of installing stud bolts 12 is repeated for all of the stud bolts 12 that are used to attach stiffener 14 to sidewall 16 of grain bin 18.

Once the stud bolts 12 are installed on the sidewall 16 using inner nut 88, stiffener 14 is installed on stud bolt 12. More specifically, stiffener 14 is inserted onto the second threaded end 72 of stud bolt 12 that extends outward from the exterior surface 32 of sidewall 16. This is accomplished by placing the hole 60 of center wall 52 of stiffener 14 over the second threaded end 72 of stud bolt 12. Once stiffener 14 is installed on stud bolts 12, outer nut 90 is threaded on the outward end of the second threaded end 72 of stud bolt 12. The outer nut 90 is then tightened against the exterior surface 48 of the center wall 52 of the stiffener 14 thereby forcing the interior surface 50 of the stiffener 14 toward the exterior surface 32 of the sidewall 16.

Above step 40 between adjacent rings 36, as the outer nut 90 is tightened, the outer nut 90 forces the interior surface 50 of stiffener 14 into engagement with the feature 74 thereby forming a tight frictional engagement between center wall 52 of stiffener 14 and the feature 74 of stud bolt 12. In this position, the stiffener 14 is tightly held in compression between the outer nut 90 and the feature 74.

Below step 40 between adjacent rings 36, as the outer nut 90 is tightened, the outer nut 90 forces the interior surface 50 of stiffener 14 toward feature 74, however when the distance "D" is greater than the amount of bend or flex that the stiffener 14 can provide, a gap is left between the interior surface 50 of the stiffener 14 and the exterior edge of the feature 74. In this arrangement, as the feature 74 and the sealing member 82 have already formed a seal with the exterior surface 32 of the sidewall 16, the gap does not present a water infiltration problem. That is, because the feature 74 and the sealing member 82 have already formed a seal with the exterior surface 32 of the sidewall 16 the exposed portion of stud bolt 12 between the interior surface 50 of center wall 52 does not facilitate water to travel along the threads of the shaft of stud bolt 12 and into the grain bin 18 and/or between the layers of laminated sheets 24. In addition, in this arrangement, the torque applied to the outer nut 90 holds the stiffener 14 in rigid tension with the sidewall 16 thereby providing the desired enhancement in strength and rigidity to sidewall 16.

Another benefit to this assembly process is by inserting the stud bolts 12 into the sidewall 16 and having the second threaded end 72 of stud bolt 12 extend outward from sidewall 16 after stud bolt 12 is tightened to sidewall 16 this facilitates easy hanging of the stiffener 14 onto the second threaded ends 72. That is, because the stud bolts 12 are rigidly affixed to the sidewall 16 prior to the installation of the stiffener 14 this allows a user to align the holes 60 in the center wall 52 of stiffener 14 with the second threaded ends 72 of stud bolts 12 and once aligned slide the stiffener 14 onto the second threaded ends 72 of stud bolts 12. Once the stiffener 14 is placed over the second threaded ends 72 of stud bolts 12, the stud bolts 12 tend to hold the stiffener 14 in place as the outer nuts 90 are installed. This eases the installation process by helping to facilitate alignment of the stiffener 14 and by holding the stiffener 14 during installation. As such, in this way, the use of stud bolts 12 eases and speeds the installation process.

This assembly process can be performed with conventional tools used by every grain bin millwright. In addition, this process can be performed on practically any grain bin, new or existing.

From the above discussion it will be appreciated that the system of connecting a stiffener to the sidewall of a grain bin presented herein improves upon the state of the art.

Specifically, the system of connecting a stiffener to the sidewall of a bin presented: prevents leaks; is easy to use; provides a seal against the exterior surface of the sidewall of the grain bin regardless whether a gap is present between the stiffener and the sidewall; has a long useful life; is durable; is easy to manufacture; is relatively inexpensive; has a robust design; is high quality; is easy to install; can be installed using conventional equipment and tools; reduces or prevents water from getting between layers of a laminated sidewall; reduces grain spoilage; reduces grain bin corrosion; reduces clumping of grain within a grain bin, among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A grain bin system, comprising:
a sidewall having an interior surface and an exterior surface;
a stiffener having a first surface and a second surface, the first surface facing the exterior surface of the sidewall;
a stud bolt having a first threaded portion, a second threaded portion, and a feature between the first threaded portion and the second threaded portion;
a first nut on the first threaded portion; and
a second nut on the second threaded portion, wherein the feature is between the first surface of the stiffener and the exterior surface of the sidewall, the first threaded portion is exposed at the interior surface of the sidewall, and the second threaded portion is exposed at the second surface of the stiffener.

2. The grain bin system of claim 1, wherein the feature seals an aperture in the sidewall to prevent water from flowing into the aperture.

3. The grain bin system of claim 1, further comprising:
a compressible member between the feature and the exterior surface of the sidewall.

4. The grain bin system of claim 1, wherein the sidewall is comprised of a plurality of sheets.

5. The grain bin system of claim 1, wherein the sidewall is comprised of a plurality of overlapping layers.

6. The grain bin system of claim 1, wherein the sidewall is comprised of a plurality of overlapping corrugated sheets.

7. The grain bin system of claim 1, wherein the feature is at least one of a step, a shoulder, a flange, a hex head member, and a square head member.

8. The grain bin system of claim 1, further comprising:
a compressible member between the feature and the exterior surface of the sidewall; and
a washer between the compressible member and the feature.

9. The grain bin system of claim 1, further comprising:
a compressible member between the feature and the exterior surface of the sidewall; and
wherein the compressible member is bonded to a rigid washer.

10. The grain bin system of claim 1, wherein the first nut bears against the interior surface of the sidewall.

11. The grain bin system of claim 1, further comprising:
a compressible member between the feature and the exterior surface of the sidewall; and
wherein the compressible member is compressed between the exterior surface of the sidewall and the feature.

12. The grain bin system of claim 1, further comprising:
a compressible member between the feature and the exterior surface of the sidewall; and
wherein the first nut presses against the interior surface of the sidewall, the second nut presses against the second surface of the stiffener, and the compressible member is compressed between the feature and the exterior surface of the sidewall.

13. A grain bin system comprising:
a ring shaped sidewall comprised of a plurality of sheets, the ring shaped sidewall having an interior surface and an exterior surface;
a stiffener attached to the exterior surface of the ring shaped sidewall; and
a stud bolt attaching the stiffener to the exterior surface of the ring shaped sidewall, the stud bolt having a first threaded end extending through the stiffener, a second threaded end extending through the ring shaped sidewall, and a feature between the stiffener and the exterior surface.

14. The grain bin system of claim 13, further comprising:
a flexible member penetrated by the stud bolt and arranged between the ring shaped sidewall and the stiffener.

15. The grain bin system of claim 13, further comprising:
a flexible member between the feature and the ring shaped sidewall.

16. The grain bin system of claim 13, further comprising:
a first nut engaging the threads of the first threaded end; and
a second nut engaging the threads of the second threaded end, wherein the sidewall is compressed between the second threaded nut and the feature.

17. A method of assembling a grain bin comprising:
providing a stud bolt having a first threaded portion, a second threaded portion, and a feature between the first threaded portion and the second threaded portion;
inserting the first threaded portion through a grain bin sidewall;
attaching a first nut to the first threaded portion so that the sidewall is compressed between the first nut and the feature;
arranging a stiffener so that the second threaded portion passes through the stiffener;
attaching a second nut to the second threaded portion so that nut bears against an exterior surface of the stiffener.

18. The method of claim 17, wherein a flexible member is arranged between the feature and the grain bin sidewall.

19. The method of claim 17, wherein a washer and a flexible member is arranged between the feature and the grain bin sidewall, the washer is arranged between the flexible member and the feature and the flexible member is compressed to create a seal against an opening of the grain bin sidewall.

20. The method of claim 17, further comprising:
overlapping a plurality of layers of metal to form the grain bin sidewall having a ring shape.

21. The method of claim 17, further comprising:
overlapping a plurality of corrugated metal sheets to form the grain bin sidewall having a ring shape.

* * * * *